(12) United States Patent
Chu et al.

(10) Patent No.: US 11,457,448 B2
(45) Date of Patent: Sep. 27, 2022

(54) METHOD AND APPARATUS FOR OPERATING A BASIC SERVICE SET (BSS)

(71) Applicant: NXP USA, Inc., Austin, TX (US)

(72) Inventors: Liwen Chu, San Ramon, CA (US); Rui Cao, Sunnyvale, CA (US); Sudhir Srinivasa, Los Gatos, CA (US); Hongyuan Zhang, Fremont, CA (US); Huiling Lou, Sunnyvale, CA (US); Young Hoon Kwon, Laguna Nigel, CA (US)

(73) Assignee: NXP USA, Inc., Austin, TX (US)

( * ) Notice: Subject to any disclaimer, the term of this patent is extended or adjusted under 35 U.S.C. 154(b) by 77 days.

(21) Appl. No.: 17/182,048

(22) Filed: Feb. 22, 2021

(65) Prior Publication Data
US 2021/0266890 A1 Aug. 26, 2021

Related U.S. Application Data

(60) Provisional application No. 62/984,106, filed on Mar. 2, 2020, provisional application No. 62/980,210, filed on Feb. 22, 2020.

(51) Int. Cl.
*H04W 72/04* (2009.01)
*H04W 72/12* (2009.01)
*H04W 72/00* (2009.01)
*H04W 80/02* (2009.01)

(52) U.S. Cl.
CPC ....... *H04W 72/048* (2013.01); *H04W 72/005* (2013.01); *H04W 72/12* (2013.01); *H04W 80/02* (2013.01)

(58) Field of Classification Search
CPC .. H04W 72/042; H04W 72/048; H04W 72/12
USPC ......................................... 370/329
See application file for complete search history.

(56) References Cited

U.S. PATENT DOCUMENTS

2019/0349930 A1 11/2019 Chu et al.

*Primary Examiner* — Angel T Brockman

(57) ABSTRACT

A method and an apparatus for operating a Basic Service Set (BSS) are disclosed. A method involves announcing, by a first wireless device to a second wireless device, a BSS operating channel, wherein the first wireless device has at least one of a first transmission power capability and a first bandwidth capability, the second wireless device has at least one of a second transmission power capability that is less than the first transmission power capability and a second bandwidth capability that is narrower than the first bandwidth capability, and wherein the BSS operating channel is at least one of a punctured operating channel and an unpunctured operating channel, associating, by the second wireless device, with the first wireless device via the announcement of the BSS operating channel from the first wireless device, and exchanging frames between the first wireless device and the second wireless device in the BSS operating channel.

18 Claims, 17 Drawing Sheets

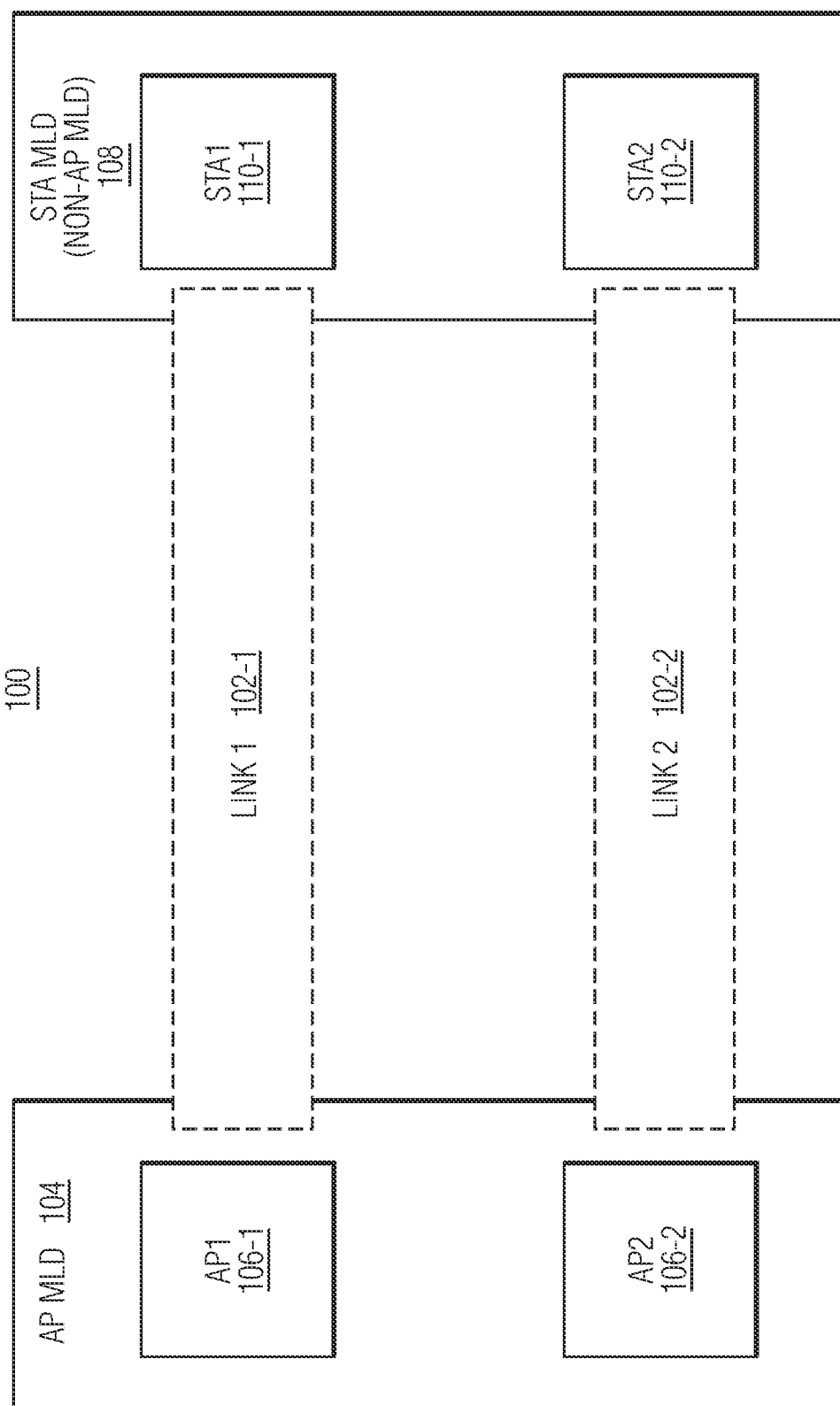

METHOD AND APPARATUS FOR OPERATING A BASIC SERVICE SET (BSS)

CROSS-REFERENCE TO RELATED APPLICATIONS

This application is entitled to the benefit of U.S. Provisional Patent Application Ser. No. 62/980,210, filed on Feb. 22, 2020, and U.S. Provisional Patent Application Ser. No. 62/984,106, filed on Mar. 2, 2020, each of which is incorporated by reference herein.

BACKGROUND

In wireless communications, wireless devices, e.g., access point (AP) multi-link devices (MLDs) or non-AP MLDs, e.g., STA multi-link devices (STA MLDs), can execute various Basic Service Set (BSS) operations, such as announcements of some features or operations for channels in a multi-link BSS via one or more channels. As an example, a wireless AP MLD using the multi-link BSS may wirelessly transmit a Physical Layer Protocol Data Unit (PPDU) on each channel to transmit information of multiple channels and update BSS operating parameters. However, when each channel has a wide bandwidth (e.g., 320 MHz or 160 MHz) and APs of the wireless AP MLD have greater capacities (e.g., bandwidth, transmission power, etc.) than an associated STA MLD's STAs involved in the BSS operations, there is a need to efficiently execute the BSS operations.

SUMMARY

Embodiments of a method and an apparatus for operating a Basic Service Set (BSS) are disclosed. In an embodiment, a method for operating a BSS involves announcing, by a first wireless device to a second wireless device, a BSS operating channel, wherein the first wireless device has at least one of a first transmission power capability and a first bandwidth capability, the second wireless device has at least one of a second transmission power capability that is less than the first transmission power capability and a second bandwidth capability that is narrower than the first bandwidth capability, and wherein the BSS operating channel is at least one of a punctured operating channel and an unpunctured operating channel, associating, by the second wireless device, with the first wireless device via the announcement of the BSS operating channel from the first wireless device, and exchanging frames between the first wireless device and the second wireless device in the BSS operating channel.

In an embodiment, the method further involves announcing, by the first wireless device to the second wireless device, a group of subchannels, wherein each subchannel includes at least one 20 MHz channel, and wherein each subchannels is included in the BSS operating channel, parking the second wireless device in at least one subchannel via a negotiation between the first wireless device and the second wireless device, and exchanging frames between the first wireless device and the second wireless device in at least one subchannel that the second wireless device is parked in.

In an embodiment, the method further involves announcing, by the first wireless device to the second wireless device, a dummy primary 20 MHz channel for each subchannel that does not include a primary 20 MHz channel, and wherein the dummy primary 20 MHz channel is an unpunctured 20 MHz channel.

In an embodiment, an operating bandwidth of the second wireless device that does not cover the primary 20 MHz channel covers the dummy primary 20 MHz channel when changing the operating bandwidth.

In an embodiment, the method further involves announcing, by the first wireless device, operating parameters for the second wireless device parked in one subchannel.

In an embodiment, different operating parameters for the second wireless device parked in at least one 20 MHz channel include at least one of Enhanced Distribution Channel Access (EDCA) parameters and multi-user (MU) EDCA parameters.

In an embodiment, the first wireless device transmits soliciting frames and the second wireless device transmits responding frames that are each transmitted in the same TXOP, and wherein the responding frames are included in a Physical Layer Protocol Data Unit (PPDU) whose bandwidth is narrower than the PPDU that includes the soliciting frames.

In an embodiment, the first wireless device uses trigger information carried in at least one of a trigger frame and a triggered response scheduling (TRS) field to announce the bandwidth and the operating parameters for transmission of the responding frame, and wherein the responding frame is included in a Trigger-Based (TB) PPDU.

In an embodiment, transmission of the TB PPDU is the last transmission of a TXOP.

In an embodiment, the TB PPDU is transmitted in a TXOP protected by a Request-to-Send (RTS) frame and a Clear-to-Send (CTS) frame in a non-High Throughput (non-HT) duplicate PPDU.

In an embodiment, the first wireless device announces the bandwidth and the operating parameters of the second wireless device, and wherein the second wireless device determines the bandwidth and the operating parameters for transmission of the responding frame from the first wireless device's announcement.

In an embodiment, exchanging frames between the first wireless device and the second wireless device in the BSS operating channel further involves dividing, by the first wireless device, the BSS operating channel into subchannels, parking the second wireless device in a subchannel for at least one of a permanent period and at a specific period of time known by the first wireless device and the second wireless device, and transmitting multiple SUB-PPDUs in a PPDU on the subchannel, wherein the SUB-PPDUs are in non-overlapped subchannels and different SUB-PPDUs have at least one of a same PPDU format and a different PPDU format.

In an embodiment, the PPDU with multiple SUB-PPDUs with an MU PPDU format transmitted by the first wireless device allows multiple Broadcast resource units (RUs) in the PPDU, and wherein the Broadcast RUs are identified by different Association Identifier (AID) values in each SUB-PPDU with the MU PPDU format when more than one Broadcast RU exists.

In an embodiment, parking the second wireless device in the subchannel involves parking in a negotiated subchannel at a specific Target Wake Time (TWT) service period (SP) via a TWT Subchannel Selective Transmission (SST).

In an embodiment, the announcement of the BSS operating channel from the first wireless device announces at least one of a 20 MHz unpunctured channel and a 40 MHz unpunctured channel via at least one of a per-20 MHz bitmap and a per-40 MHz bitmap.

The method of claim 1, wherein the announcement of the BSS operating channel from the first wireless device identifies a channel segment via a center frequency of the channel segment for at least one of an 80 MHz BSS operating channel, a 160 MHz BSS operating channel, and a 320 MHz BSS operating channel.

An embodiment of a first wireless device is also disclosed. The first wireless device includes a processor configured to establish a BSS operating channel, wherein the BSS operating channel is at least one of a punctured operating channel and an unpunctured operating channel, announce at least one of the punctured operating channel and the unpunctured operating channel of the BSS operating channel to a second wireless device, associate with the second wireless device via the announcement of the BSS operating channel from the first device, and exchange frames with the second wireless device in the BSS operating channel.

Another embodiment of a method for operating a BSS. The method involves, in a punctured transmission, announcing, by a first wireless device to a second wireless device, a BSS operating channel, wherein the first wireless device has at least one of a first transmission power capability and a first bandwidth capability, the second wireless device has at least one of a second transmission power capability that is less than the first transmission power capability and a second bandwidth capability that is narrower than the first bandwidth capability, and wherein the BSS operating channel is at least one of a punctured operating channel and an unpunctured operating channel, associating, by the second wireless device, with the first wireless device via the announcement of the BSS operating channel from the first wireless device, and exchanging frames between the first wireless device and the second wireless device in the BSS operating channel.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 1 depicts a multi-link communications system.

Throughout the description, similar reference numbers may be used to identify similar elements.

DETAILED DESCRIPTION

Figure 2A:
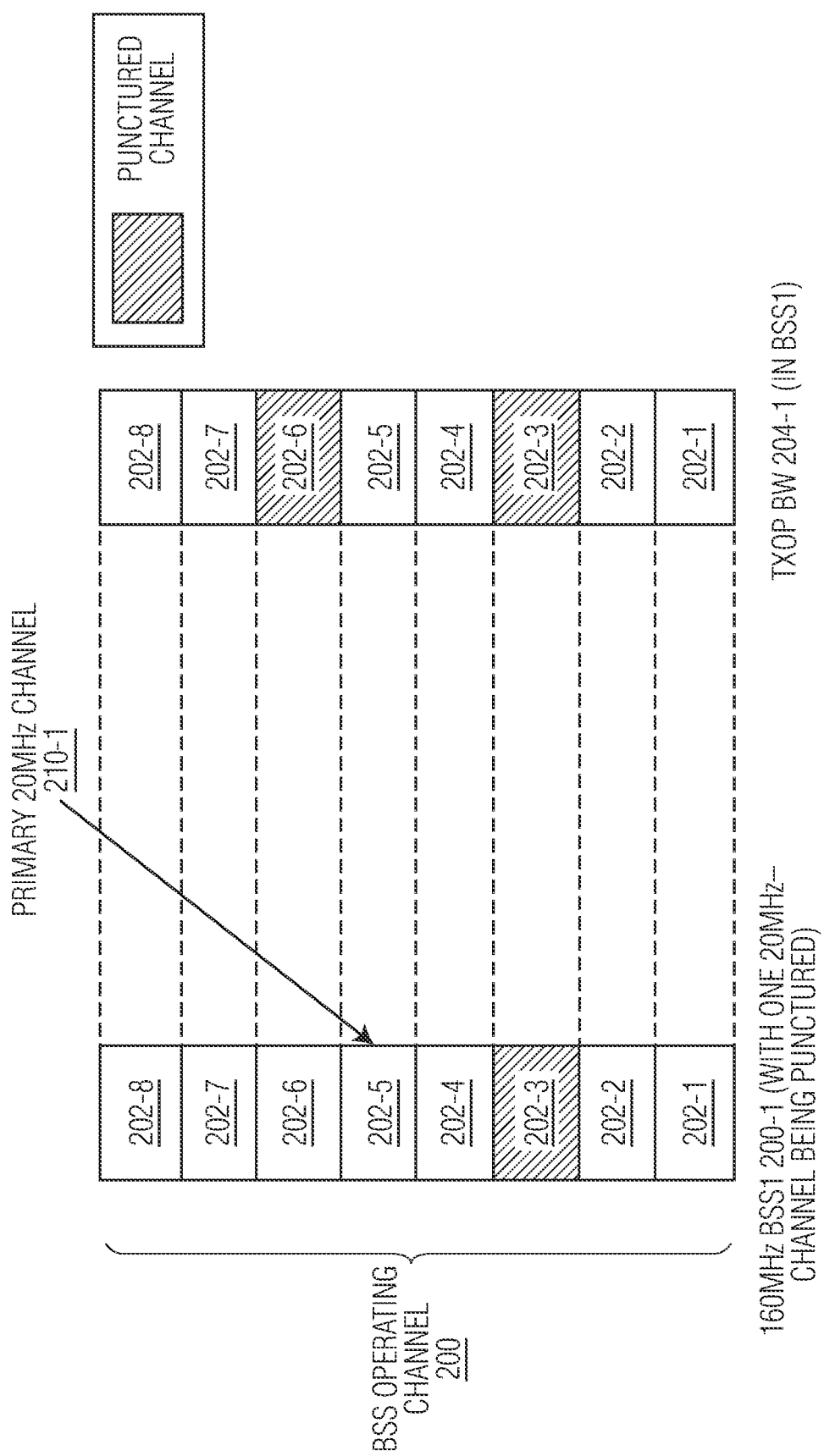
FIG. 2A depicts an example of a Basic Service Set (BSS) operating channel.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, a wireless device, e.g., an access point (AP) multi-link device (MLD) of a wireless local area network (WLAN) transmits data to at least one associated station (STA) MLD. The AP MLD is configured to operate with associated STA MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and/or next-generation communication protocols may be referred to herein as "non-legacy" features. In some embodiments of the wireless communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., IEEE 802.11n, IEEE 802.11ac, IEEE 802.11ax, etc.) may be collectively referred to herein as "legacy" communication protocols.

FIG. 1 depicts a multi-link communications system 100 that is used for wireless (e.g., WiFi) communications. In the embodiment depicted in FIG. 1, the multi-link communications system includes one AP multi-link device, which is implemented as AP MLD 104, and one non-AP STA multi-link device, which is implemented as STA MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes multiple AP MLDs with one STA MLD, or multiple AP MLDs with more than one STA MLD. In another example, although the multi-link communications system is shown in FIG. 1 as being connected in a certain topology, the network topology of the multi-link communications system is not limited to the topology shown in FIG. 1. Although the system described with reference to FIG. 1 involves multi-link communications, the techniques described herein are also applicable to single-link communications. Furthermore, the techniques described herein may also be applicable to each link of a multi-link communications system.

In the embodiment depicted in FIG. 1, the AP MLD 104 includes two radios, implemented as access points (APs) 106-1 and 106-2. In such an embodiment, the APs may be AP1 106-1 and AP2 106-2. In some embodiments, the AP MLD 104 implements upper layer Media Access Control (MAC) functionalities (e.g., beacon acknowledgement establishment, reordering of frames, etc.) and the APs 106-1 and 106-2 implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol. In some embodiments, an AP is a wireless AP that connects to a local area network (e.g., a LAN) and/or to a backbone network (e.g., the Internet) through a wired connection and that wirelessly connects to wireless stations (STAs), for example, through one or more WLAN communications protocols, such as the IEEE 802.11 protocol. In some embodiments, an AP includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different size BSS operating channel. For example, AP1 106-1 may operate in a 320 MHz BSS operating channel and AP2 106-2 may operate in a 160 MHz BSS operating channel. In some of the embodiments, each of the APs 106-1 or 106-2 of the AP MLD 104 may separate the 320 MHz BSS operating channel or the 160 MHz BSS operating channel into multiple subchannels. For example, AP1 106-1 may separate the 320 MHz BSS operating channel into four 80 MHz subchannels and AP2 106-2 may separate the 160 MHz BSS operating channel into two 80 MHz subchannels. Examples of channels within the 80 MHz subchannels may include a 20 MHz channel of a BSS and a 40 MHz channel of the BSS. Although the AP MLD 104 is shown in FIG. 1 as including two APs, other embodiments of the AP MLD 104 may include more than two APs.

In the embodiment depicted in FIG. 1, the non-AP STA multi-link device, implemented as STA MLD 108, includes two radios which are implemented as non-AP STAs 110-1 and 110-2. In such an embodiment, the non-AP STAs may be STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are part of the STA MLD 108, such that the STA MLD is a communications device that wirelessly connects to wireless APs. For example, the STA MLD 108 may be implemented in a laptop, a desktop personal computer (PC), a mobile phone, or other communications device that supports at least one WLAN communications protocol. In some embodiments, the non-AP STA MLD 108 is a communications device compatible with at least one IEEE 802.11 protocol (e.g., the IEEE 802.11be protocol). In some embodiments, the STA MLD 108 implements a common MAC data service interface and the non-AP STAs 110-1 and 110-2 implement a lower layer MAC data service interface. In some embodiments, the AP MLD 104 and/or the STA MLD 108 identifies which communication links support the multi-link operation during a multi-link operation setup phase and/or exchanges information regarding multi-link capabilities during the multi-link operation setup phase. In some embodiments, each of the non-AP STAs 110-1 and 110-2 of the STA MLD 108 may operate in a different frequency block. For example, the non-AP STA 110-1 may operate in the 2.4 GHz frequency block and the non-AP STA 110-2 may operate in the 5 GHz frequency block. In some embodiments, STA1 110-1 of STA MLD 108 may operate in different subchannels of an AP's (e.g., AP1 106-1) BSS operating channel. In some embodiments, STA2 110-2 of STA MLD 108 may operate in different subchannels of another AP's (e.g., AP2 106-2) BSS operating channel. For example, STA1 110-1 may operate in a first subchannel of a first BSS operating channel and STA2 110-2 may operate in a first subchannel of a second BSS operating channel. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 104 via two communication links, e.g., link1 102-1 and link2 102-2. For example, each of the non-AP STAs 110-1 or 110-2 communicates with an AP 106-1 or 106-2 via corresponding communication links 102-1 or 102-2. In an embodiment, a communication link (e.g., link1 102-1 or link2 102-2) may include a BSS operating channel established by an AP (e.g., AP1 106-1 or AP2 106-2) that features multiple 20 MHz channels used to transmit frames (e.g., Physical Layer Protocol Data Units (PPDUs), beacons, management frames, etc.) between a first wireless device (e.g., an AP) and a second wireless device (e.g., a STA). In some embodiments, a 20 MHz channel may be a punctured 20 MHz channel or an unpunctured 20 MHz channel. In some embodiments, the 20 MHz channels may be aggregated to form a subchannel (e.g., an 80 MHz subchannel or a 160 MHz subchannel). Although the STA MLD 108 is shown in FIG. 1 as including two non-AP STAs, other embodiments of the STA MLD 108 may include one non-AP STA or than two non-AP STAs. In addition, although the AP MLD 104 communicates (e.g., wirelessly communicates) with the STA MLD 108 via multiple links 102-1 and 102-2, in other embodiments, the AP MLD 104 may communicate (e.g., wirelessly communicates) with the STA MLD 108 via one link or more than two communication links.

The EHT communication protocol (i.e., IEEE 802.11be standard) is a next version of the communications protocol that will succeed the IEEE High Efficiency (HE) 802.11ax standard. Additional future versions (e.g., next-generation communication protocols) of the IEEE 802.11 communication protocol may succeed IEEE 802.11ax or IEEE 802.11be. It is desirable that future versions of the communication protocol provide backward compatibility and support interoperability with legacy versions of the IEEE 802.11 communication protocol. However, wireless devices operating according to a legacy communication protocol may be limited to utilizing a narrower bandwidth (e.g., less than 320 MHz) or less transmission power than wireless devices operating according to non-legacy communication protocols. In some embodiments, non-AP MLDs may only support a narrower bandwidth or less transmission power than an associated AP MLD. In some embodiments, the EHT communication protocol permits a wireless device (e.g., an AP) in a BSS to establish a BSS operating channel through a BSS operation element that includes multiple 20 MHz channels aggregated together to form a subchannel (sometimes referred to herein as a "segment" or "channel segment"). For example, the wireless device may separate a 320 MHz BSS operating channel by aggregating every four adjacent 20 MHz channels to form an 80 MHz subchannel, or by aggregating every eight adjacent 20 MHz channels to form a 160 MHz subchannel.

In addition, a first wireless device (e.g., an AP or an AP of an AP MLD) in the BSS may also establish the BSS operating channel with punctured 20 MHz channels and unpunctured 20 MHz channels through the BSS operation element (e.g., static channel puncture), such that the first wireless device may have a first bandwidth (e.g., 320 MHz operating channel) permitted by a wireless communication protocol (e.g., the EHT communication protocol), but in which one or more 20 MHz channels within the first bandwidth are punctured; and the first bandwidth of the first wireless device that includes the punctured operating channel may be larger than a second bandwidth (e.g., 80 MHz) of a second wireless device (e.g., a STA or a STA of a STA MLD) that operates in the same BSS as the first wireless device. As an example, the first wireless device may establish the punctured operating channel having a first bandwidth defined by the first wireless device to be 160 MHz, but in which one 20 MHz channel within the first bandwidth of 160 MHz is punctured, according to an embodiment. As another example, the first wireless device may establish the punctured operating channel having a first bandwidth defined by the first wireless device to be 320 MHz, but in which two 20 MHz channels within the first bandwidth of 320 MHz are punctured, according to an embodiment. Furthermore, the first/second wireless device may include a primary channel (e.g., a primary 20 MHz channel) within the BSS which may be used to detect frames (e.g., PPDUs, beacons, management frames, etc.). In some embodiments, if the first/second wireless device utilizes a bandwidth wider than 20 MHz, then the first/second wireless device may detect a PPDU that has a size greater than or equal to 20 MHz via the primary 20 MHz channel.

BSS operating channels that may be announced by a BSS operation element which feature punctured 20 MHz channels, unpunctured 20 MHz channels, and primary 20 MHz channels are described in further detail with reference to FIGS. 2A-2B.

FIG. 2A depicts an example of a BSS operating channel 200. In some embodiments, the BSS operating channel 200 features one punctured 20 MHz channel announced by a BSS operation element (not shown), and a Transmission Opportunity (TXOP) with two punctured 20 MHz channels through dynamic puncture. The BSS operating channel depicted in FIG. 2A may be used by a wireless device in a BSS to determine a Transmission Opportunity (TXOP BW) of a TXOP within the BSS. With reference to FIG. 2A, the BSS operating channel 200 of the BSS announced by the BSS operation element is shown as including a primary 20 MHz channel, a punctured 20 MHz channel, and unpunctured 20 MHz channels which may be used by the wireless device to detect/transmit/receive PPDUs. In particular, FIG. 2A depicts the BSS operating channel 200 of a first 160 MHz BSS, 160 MHz BSS1 200-1, that includes eight 20 MHz channels, implemented as a first 20 MHz channel 202-1, a second 20 MHz channel 202-2, a third 20 MHz channel 202-3, a fourth 20 MHz channel 202-4, a fifth 20 MHz channel 202-5, a sixth 20 MHz channel 202-6, a seventh 20 MHz channel 202-7, and an eighth 20 MHz channel 202-8 that each correspond with a TXOP BW 204-1 of the 160 MHz BSS1 200-1 (shown by dashed lines). In some embodiments, the 160 MHz BSS1 200-1 may feature a primary 20 MHz channel to perform Clear Channel Assessment (CCA) and detect PPDUs that have a size greater than or equal to 20 MHz, for example, the fifth 20 MHz channel 202-5 may function as the primary 20 MHz channel 210-1 of the 160 MHz BSS1 200-1.

In some embodiments, the 160 MHz BSS1 200-1 may feature punctured 20 MHz channels and/or unpunctured 20 MHz channels, for example, the third 20 MHz channel 202-3 may be a punctured 20 MHz channel and each of the other channels (i.e., each channel of the 160 MHz BSS1 200-1 except the third 20 MHz channel 202-3) may be unpunctured 20 MHz channels. In such an embodiment, because the third 20 MHz channel 202-3 of the 160 MHz BSS1 200-1 is punctured via the BSS operation element, the third 20 MHz channel 202-3 of the TXOP BW 204-1 may also be punctured in each TXOP. In some embodiments, other unpunctured 20 MHz channels may also be punctured dynamically in a TXOP. For example, the TXOP BW 204-1 may be determined by the unpunctured 20 MHz channel(s) and the punctured 20 MHz channel(s) of the BSS operating channel 200 of the 160 MHz BSS1 200-1 and the on-going TXOP of a neighbor BSS (not shown). For example, if the neighbor BSS (not shown) is transmitting on some 20 MHz channels overlapped with the operating channel of the 160 MHz BSS1 200-1, then the TXOP BW 204-1 of the 160 MHz BSS1 200-1 may puncture additional 20 MHz channels (e.g., the sixth 20 MHz channel 202-6) dynamically in addition to the third 20 MHz channel 202-3. As another example, if the neighbor BSS is using the sixth 20 MHz channel 202-6 of the 160 MHz BSS1 200-1, then the sixth 20 MHz channel 202-6 may be dynamically punctured in the TXOP BW 204-1.

Figure 2B:
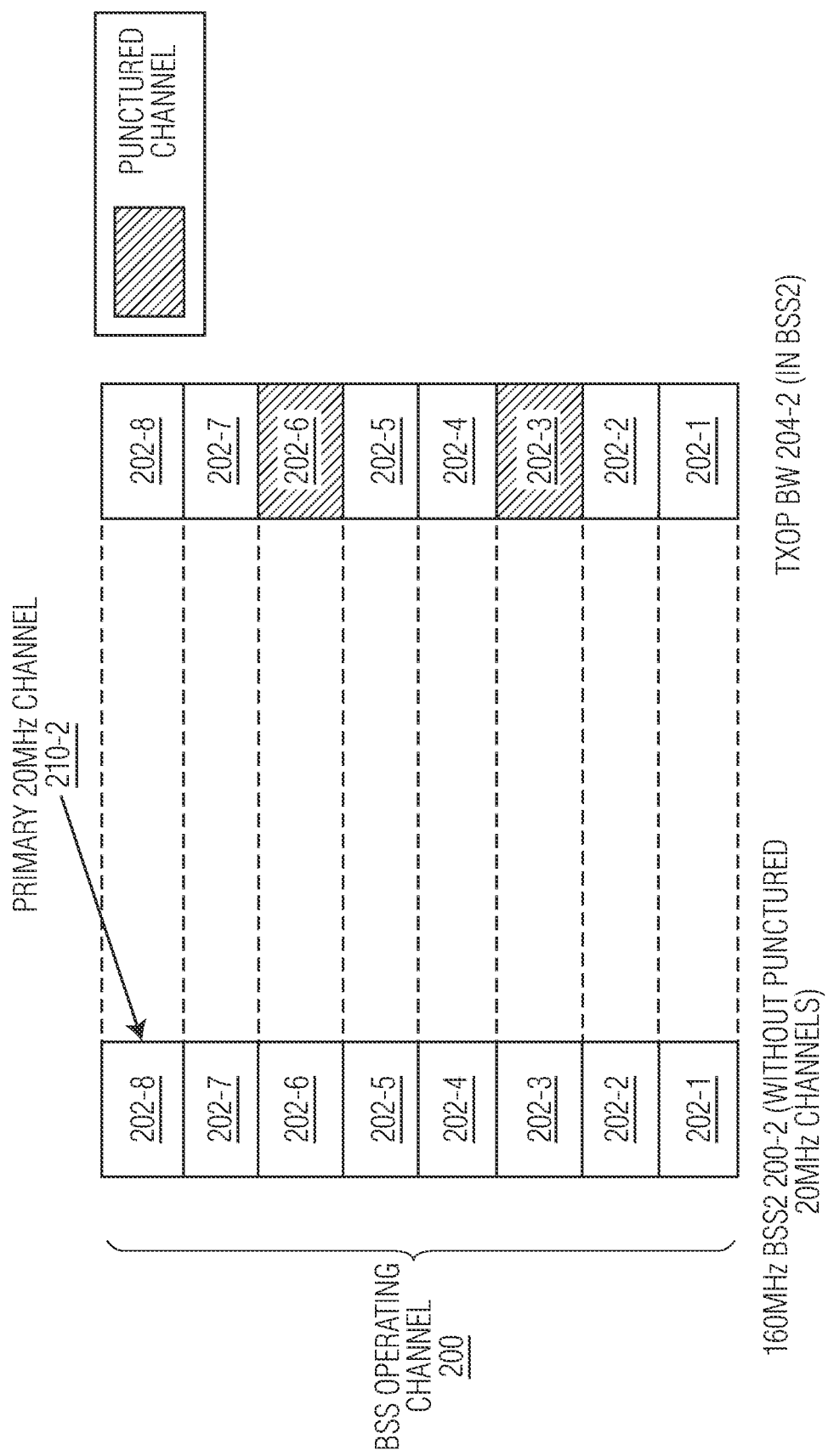
FIG. 2B depicts another example of a BSS operating channel.

FIG. 2B depicts another example of a BSS operating channel 200. In some embodiments, the BSS operating channel 200 may not feature punctured 20 MHz channels and a TXOP with dynamically punctured 20 MHz channels. The BSS operating channel depicted in FIG. 2B may be used by a wireless device in a BSS to determine a TXOP BW of the BSS. With reference to FIG. 2B, the BSS operating channel of the BSS announced by a BSS operation element (not shown) is shown as including a primary 20 MHz channel and unpunctured 20 MHz channels which may be used by the wireless device to detect/transmit/receive PPDUs. In particular, FIG. 2B depicts the BSS operating channel 200 of a second 160 MHz BSS, 160 MHz BSS2 200-2 announced by the BSS operation element, that includes eight 20 MHz channels, implemented as the first 20 MHz channel 202-1, the second 20 MHz channel 202-2, the third 20 MHz channel 202-3, the fourth 20 MHz channel 202-4, the fifth 20 MHz channel 202-5, the sixth 20 MHz channel 202-6, the seventh 20 MHz channel 202-7, and the eighth 20 MHz channel 202-8. In some embodiments, within the TXOP BW 204-2 of the 160 MHz BSS2 200-2, two 20 MHz channels, for example, 20 MHz channel 202-3 and 20 MHz channel 202-6, may be dynamically punctured sine neighbor BSSs (not shown) are using 20 MHz channel 202-3 and 20 MHz channel 202-6.

With reference to FIGS. 2A-2B, the BSS operating channel 200 of each BSS (e.g., 160 MHz BSS1 200-1 and 160 MHz BSS2 200-2) and the primary 20 MHz channels (e.g., primary 20 MHz channel 210-1 and primary 20 MHz channel 210-2) may be announced by a first wireless device (e.g., an AP) to a second wireless device (e.g., a STA) through a BSS operation element. In some embodiments, when a supported bandwidth of the second wireless device (e.g., the STA) is narrower than the supported bandwidth of the first wireless device (e.g., the AP), the second wireless device may associate with the first wireless device. In some embodiments, the STA may park in an 80 MHz subchannel or a 160 MHz subchannel which does not cover the primary 20 MHz channel of the AP. In some embodiments, when the STA and/or the AP are "parked" in a (sub)channel, it means that the STA and/or the AP operate on the (sub)channel and remain on the (sub)channel permanently or for a specified period of time. In some embodiments, the BSS operating channel may include statically punctured 20 MHz channels announced by the BSS operation element. In some embodiments, the BSS operating channel may not include statically punctured 20 MHz channels announced by the BSS operation element. In some embodiments, a TXOP may include dynamically punctured 20 MHz channels that may not be punctured through the BSS operation element. When a TXOP has dynamically punctured 20 MHz channels, the punctured operating channel(s) may be announced by an EHT PHY header or a non-High Throughput (non-HT) duplicate PPDU. In some embodiments, the primary 20 MHz channel (e.g., primary 20 MHz channel 210-1 and primary 20 MHz channel 210-2) may not be punctured in any TXOP.

In some embodiments, multiple 20 MHz channels of the BSS operating channel may be aggregated to form a subchannel. As an example, four 20 MHz channels of a 160 MHz BSS may be aggregated to form a primary 80 MHz subchannel and four different 20 MHz channels of the 160 MHz BSS may be aggregated to form a secondary 80 MHz subchannel. In such an example, the primary 80 MHz subchannel may include the primary 20 MHz channel that may be used by an AP to transmit PPDUs. In some embodiments, each 80 MHz STA may park in either the primary 80 MHz subchannel or the secondary 80 MHz subchannel. However, a STA that parks in the secondary 80 MHz subchannel, which may not include the primary 20 MHz channel, may miss the PPDU and a resource unit (RU) carried by the PPDU when dynamic channel puncture is applied to a multi-user (MU) PPDU or a single-user (SU) PPDU.

A BSS operating channel that features a primary 80 MHz subchannel, a secondary 80 MHz subchannel, and a TXOP BW where an 80 MHz STA parked in the secondary 80 MHz subchannel misses a PPDU is described in further detail with reference to FIG. 3.

Figure 3:
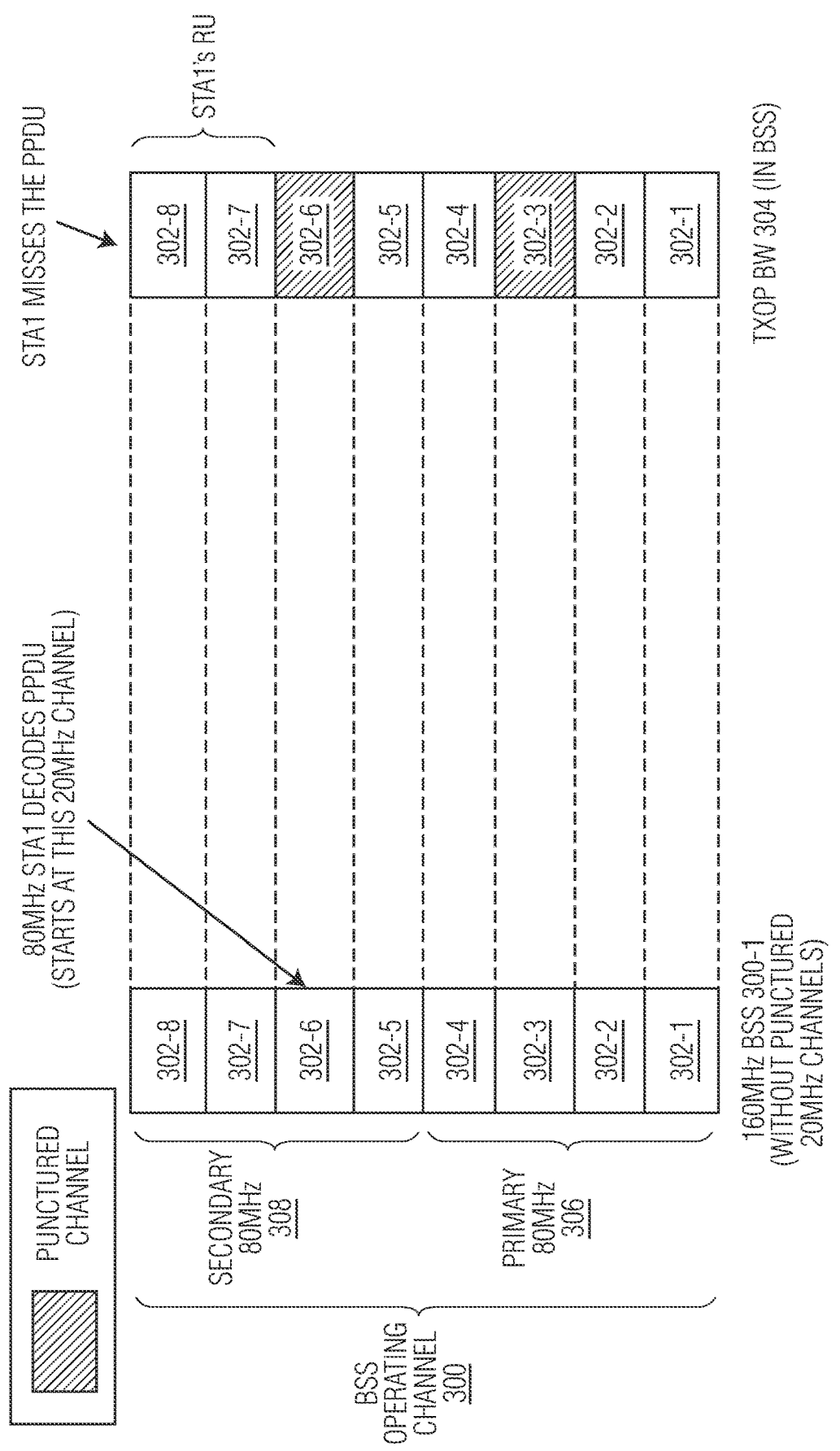
FIG. 3 depicts another example of a BSS operating channel.

FIG. 3 depicts another example of a BSS operating channel 300. In some embodiments, the BSS operating channel 300 may not feature punctured 20 MHz channels and a TXOP within a BSS with dynamically punctured 20 MHz channels. The BSS operating channel (without punctured 20 MHz channels) depicted in FIG. 3 may be used by a wireless device in a BSS to determine a TXOP BW of the BSS and to exchange frames with other wireless devices. With reference to FIG. 3, the BSS operating channel 300 of the BSS is shown as including a primary 80 MHz subchannel and a secondary 80 MHz subchannel which may be used by wireless devices to detect/transmit/receive PPDUs. In particular, FIG. 3 depicts the BSS operating channel 300 of a 160 MHz BSS 300-1 that includes eight 20 MHz channels, implemented as a first 20 MHz channel 302-1, a second 20 MHz channel 302-2, a third 20 MHz channel 302-3, a fourth 20 MHz channel 302-4, a fifth 20 MHz channel 302-5, a sixth 20 MHz channel 302-6, a seventh 20 MHz channel 302-7, and an eighth 20 MHz channel 302-8 that each correspond with a TXOP BW 304 of the 160 MHz BSS 300-1 (shown by dashed lines). In some embodiments, the BSS operating channel 300 features a primary 80 MHz subchannel 306 and a secondary 80 MHz subchannel 308. In such an embodiment, the primary 80 MHz subchannel 306 may include the first 20 MHz channel 302-1, the second 20 MHz channel 302-2, the third 20 MHz channel 302-3, and the fourth 20 MHz channel 302-4. In such an embodiment, the secondary 80 MHz subchannel 308 may include the fifth 20 MHz channel 302-5, the sixth 20 MHz channel 302-6, the seventh 20 MHz channel 302-7, and the eighth 20 MHz channel 302-8.

With reference to FIG. 3, the TXOP BW 304 may be determined from the BSS operating channel 300 of the 160 MHz BSS 300-1 and an on-going TXOP of a neighbor BSS (e.g., 160 MHz BSS1 200-1, FIG. 2A). In an embodiment, the TXOP BW 304 of the 160 MHz BSS 300-1 includes two dynamically punctured 20 MHz channels, e.g., the third 20 MHz channel 302-3 and the sixth 20 MHz channel 302-6, and other unpunctured 20 MHz channels. In such an embodiment, the dynamically punctured 20 MHz channels (e.g., the third 20 MHz channel 302-3 and the sixth 20 MHz channel 302-6) may be used by current TXOPs of the neighbor BSS. In some embodiments, a STA (e.g., STA1) may park in the secondary 80 MHz subchannel 308. In some embodiments, STA1 may start to decode PPDUs at the sixth 20 MHz channel 302-6. However, because the sixth 20 MHz channel 302-6 may be a dynamically punctured 20 MHz channel, STA1 may miss and/or not receive RUs for STA1 that are carried in the PPDUs when the sixth 20 MHz channel 302-6 is dynamically punctured in the PPDUs. Consequently, STAs missing and/or not receiving RUs carried in PPDUs causes a decrease in throughput and/or overall inefficiency in wireless device communications. Therefore, to efficiently exchange frames and operate BSSs in wireless communications, techniques in accordance with embodiments of the invention are described herein.

In accordance with an embodiment of the invention, a technique for operating a BSS involves announcing, by a first wireless device to a second wireless device, a BSS operating channel, wherein the first wireless device has at least one of a first transmission power capability and a first bandwidth capability, the second wireless device has at least one of a second transmission power capability that is less than the first transmission power capability and a second bandwidth capability that is narrower than the first bandwidth capability, and wherein the BSS operating channel is at least one of a punctured operating channel and an unpunctured operating channel, associating, by the second wireless device, with the first wireless device via the announcement of the BSS operating channel from the first wireless device, and exchanging frames between the first wireless device and the second wireless device in the BSS operating channel.

In some embodiments, features of a BSS operating channel may be announced through a channel bandwidth, channel segments, and a punctured channel unit bitmap in a BSS operation element. In an embodiment, the channel bandwidth may be 20 MHz, 40 MHz, 80 MHz, 160 MHz, or 320 MHz. In some embodiments, the channel segments may be two channel segments or one channel segment. In such an embodiment, two channel segments may be an 80 MHz+80 MHz two channel segment or a 160 MHz+160 MHz two channel segment. In some embodiments, when neither the 80 MHz+80 MHz two channel segment or the 160 MHz+ 160 MHz channel segment exists, there may only be one channel segment. In some embodiments, each channel segment may be identified via a center frequency of the channel segment. In some embodiments, the channel unit bitmap may be a per-20 MHz bitmap, such that each bit in the per-20 MHz bitmap indicates whether a related 20 MHz channel is punctured statically. In such an embodiment, if the related 20 MHz channel is not punctured statically, the related 20 MHz channel is an unpunctured 20 MHz channel. In some embodiments, the channel unit bitmap may be a per-40 MHz bitmap, such that each bit in the per-40 MHz bitmap indicates whether a related 40 MHz channel is punctured statically. In such an embodiment, if the related 40 MHz channel is not punctured statically, the related 40 MHz channel is an unpunctured 40 MHz channel.

A BSS operating channel may be separated into multiple subchannels (e.g., 80 MHz subchannels or 160 MHz subchannels) in which STAs with a supported bandwidth narrower than a BSS operating channel bandwidth may be parked in one of the subchannels. In some embodiments, within each TXOP, unpunctured 20 MHz channels within the BSS operating channel may be dynamically punctured. In such an embodiment, a STA whose supported bandwidth is narrower than the BSS operating channel bandwidth may be parked in the subchannel that may not include a primary 20 MHz channel. In addition, the TXOP may feature dynamically punctured 20 MHz channels in the subchannel that may not cover the primary 20 MHz channel, causing the STA to miss the PPDU for the STA. To avoid STAs missing PPDUs, a technique for operating a BSS that involves utilizing a dummy primary channel for each subchannel that may not include a primary 20 MHz channel is described in further detail below with reference to FIG. 4.

Figure 4:
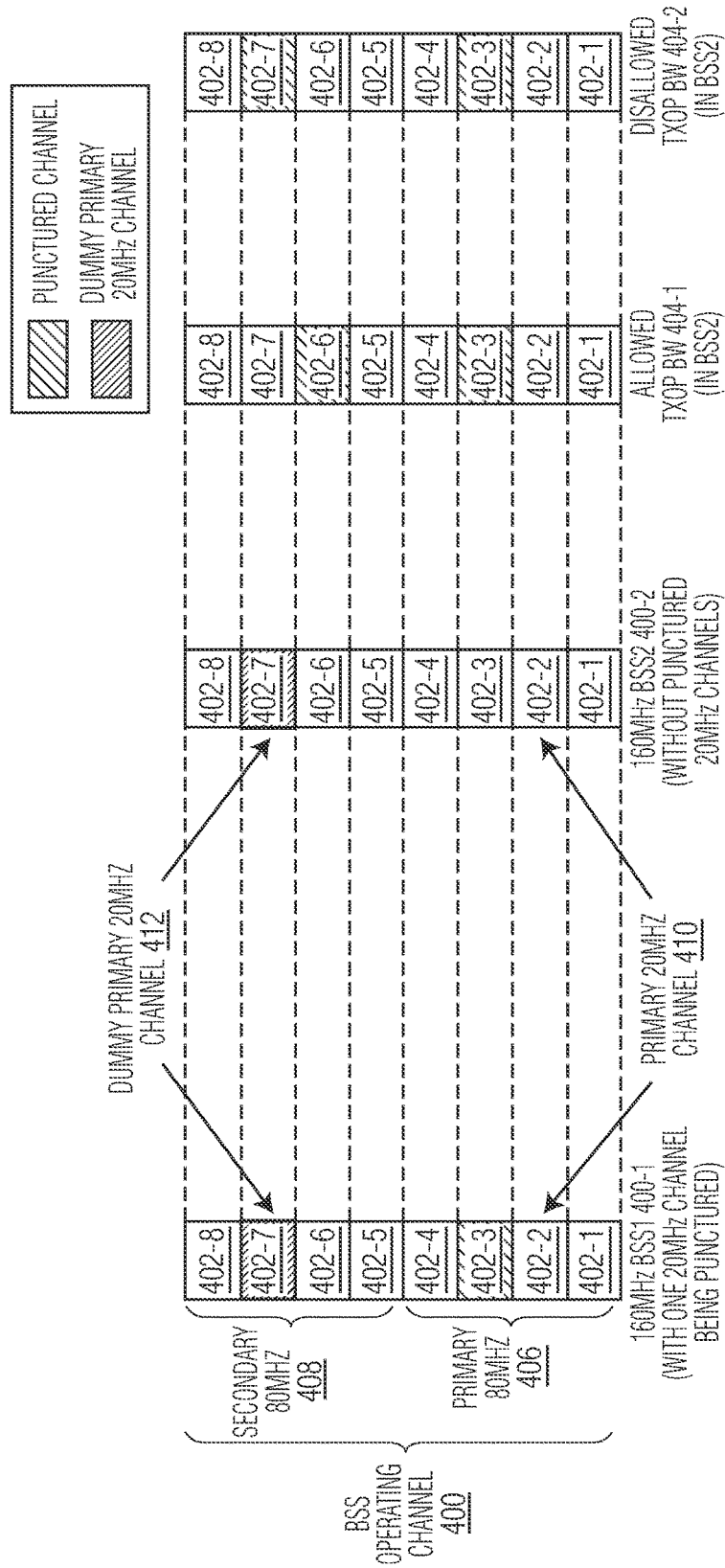
FIG. 4 depicts an example of a technique for operating a BSS in accordance with an embodiment of the invention.

FIG. 4 depicts an example of a technique for operating a BSS in accordance with an embodiment of the invention. With reference to FIG. 4, a BSS operating channel 400 of a BSS is shown as including a primary 20 MHz channel, a dummy primary 20 MHz channel, an unpunctured operating channel, and a punctured operating channel which may be used by wireless devices to detect/transmit/receive PPDUs. In particular, FIG. 4 depicts BSS operating channel 400 of a 160 MHz BSS1 400-1 that includes two 80 MHz subchannels and eight 20 MHz channels, implemented as a first 20 MHz channel 402-1, a second 20 MHz channel 402-2, a third (punctured) 20 MHz channel 402-3, a fourth 20 MHz channel 402-4, a fifth 20 MHz channel 402-5, a sixth 20 MHz channel 402-6, a seventh 20 MHz channel 402-7, and an eighth 20 MHz channel 402-8. In some embodiments, the BSS operating channel 400 of the 160 MHz BSS1 400-1 features a primary 80 MHz subchannel 406 and a secondary 80 MHz subchannel 408. In such an embodiment, the primary 80 MHz subchannel 406 may include the first 20 MHz channel 402-1, the second 20 MHz channel 402-2, the third (punctured) 20 MHz channel 402-3, and the fourth 20 MHz channel 402-4. In such an embodiment, the secondary 80 MHz subchannel 408 may include the fifth 20 MHz channel 402-5, the sixth 20 MHz channel 402-6, the seventh 20 MHz channel 402-7, and the eighth 20 MHz channel 402-8. In some embodiments, the BSS operating channel 400 of the 160 MHz BSS1 400-1 may feature a primary 20 MHz channel 410 and a dummy primary 20 MHz channel 412. In such an embodiment, the primary 20 MHz channel 410 may be the second 20 MHz channel 402-2 and the dummy primary 20 MHz channel 412 may be the seventh 20 MHz channel 402-7. In some embodiments, the dummy primary 20 MHz channel 412 may perform similar functions to those of the primary 20 MHz channel 410 without being included in the primary 80 MHz subchannel. In some embodiments, neither the primary 20 MHz channel 410 nor the dummy primary 20 MHz channel 412 may be dynamically punctured and may therefore be unpunctured 20 MHz channels. In some embodiments, the BSS operating channel 400 of the 160 MHz BSS1 400-1 may also include a statically punctured 20 MHz channel (e.g., the third 20 MHz channel 402-3 of the 160 MHz BSS1 400-1) announced by a BSS operation element.

In addition, FIG. 4 depicts BSS operating channel 400 of a 160 MHz BSS2 400-2 that includes two 80 MHz subchannels and eight 20 MHz channels, implemented as the first 20 MHz channel 402-1, the second 20 MHz channel 402-2, the third 20 MHz channel 402-3, the fourth 20 MHz channel 402-4, the fifth 20 MHz channel 402-5, the sixth 20 MHz channel 402-6, the seventh 20 MHz channel 402-7, and the eighth 20 MHz channel 402-8. In some embodiments, the BSS operating channel 400 of the 160 MHz BSS2 400-2 features the primary 80 MHz subchannel 406 and the secondary 80 MHz subchannel 408. In such an embodiment, the primary 80 MHz subchannel 406 may include the first 20 MHz channel 402-1, the second 20 MHz channel 402-2, the third 20 MHz channel 402-3, and the fourth 20 MHz channel 402-4. In such an embodiment, the secondary 80 MHz subchannel 408 may include the fifth 20 MHz channel 402-5, the sixth 20 MHz channel 402-6, the seventh 20 MHz channel 402-7, and the eighth 20 MHz channel 402-8. In some embodiments, the BSS operating channel 400 of the 160 MHz BSS2 400-2 may feature a primary 20 MHz channel 410 and a dummy primary 20 MHz channel 412. In such an embodiment, the primary 20 MHz channel 410 may be the second 20 MHz channel 402-2 and the dummy primary 20 MHz channel 412 may be the seventh 20 MHz channel 402-7. In some embodiments, the dummy primary 20 MHz channel 412 may perform similar functions to those of the primary 20 MHz channel 410 without being included in the primary 80 MHz subchannel. In some embodiments, neither the primary 20 MHz channel 410 nor the dummy primary 20 MHz channel 412 may be dynamically punctured and may therefore be unpunctured 20 MHz channels.

With reference to FIG. 4, a TXOP BW may not puncture the primary 20 MHz channel 410 or the dummy primary 20 MHz channel 412. As an example, a permitted TXOP BW may be depicted by the allowed TXOP BW 404-1 of the 160 MHz BSS1 400-1, which is shown as including two punctured 20 MHz channels, e.g., the third 20 MHz channel 402-3 and the sixth 20 MHz channel 402-6. In such an embodiment, the third 20 MHz channel 402-3 and the sixth 20 MHz channel 402-6 may be punctured because neither channel is the same as the primary 20 MHz channel 410 (e.g., the second 20 MHz channel 402-2) or the dummy primary 20 MHz channel 412 (e.g., the seventh 20 MHz channel 402-7). In such an embodiment, with the allowed TXOP BW 404-1, an 80 MHz STA parked in the secondary 80 MHz subchannel 408 may decode a PPDU in the secondary 80 MHz subchannel 408 because the dummy primary 20 MHz channel may not be punctured dynamically. As another example, a non-permitted TXOP BW may be depicted by the disallowed TXOP BW 404-2 of the 160 MHz BSS1 400-1, which is shown as including two punctured 20 MHz channels, e.g., the third 20 MHz channel 402-3 and the seventh 20 MHz content channel 402-7. In such an embodiment, although the third 20 MHz channel 402-3 may be punctured because the third 20 MHz channel 402-3 is neither the primary 20 MHz channel 410 (e.g., the second 20 MHz channel 402-2) or the dummy primary 20 MHz channel 412 (e.g., the seventh 20 MHz channel 402-7), the seventh 20 MHz channel 402-7 may not be punctured because the seventh 20 MHz channel 402-7 is the dummy primary 20 MHz channel 412 included in the BSS operating channel 400 of the 160 MHz BSS1 400-1.

With further reference to FIG. 4, when a subchannel (e.g., the primary 80 MHz subchannel 406) includes a primary 20 MHz channel (e.g., the primary 20 MHz channel 410), a dummy primary 20 MHz channel (e.g., the dummy primary 20 MHz channel 412) may be defined for each subchannel that may not include the primary 20 MHz channel. As an example, because the primary 80 MHz subchannel 406 includes the primary 20 MHz channel 410 and the secondary 80 MHz subchannel 408 of the 160 MHz BSS1 400-1 does not include the primary 20 MHz channel 410, the dummy primary 20 MHz channel 412 may be defined and implemented as the seventh 20 MHz channel 402-7. In some embodiments, the dummy primary 20 MHz channel may be any 20 MHz channel in any subchannel that does not include a primary 20 MHz channel. In some embodiments, a STA parked in the secondary 80 MHz subchannel 408 may detect a PPDU starting from the dummy primary 20 MHz channel 412. In some embodiments, a first wireless device (e.g., an AP) may announce the dummy primary 20 MHz channel to a second wireless device (e.g., a STA) via a management frame (e.g., beacons, Probe Response, (Re)Association Response frame, new defined action frame, Target Wake Time (TWT) setup frame, etc.).

In some embodiments, the dummy primary 20 MHz channel may be changed during BSS operation. A technique for announcing a dummy primary 20 MHz channel and future dummy primary 20 MHz channel via management frames is described in further detail below with reference to FIG. 5.

Figure 5:
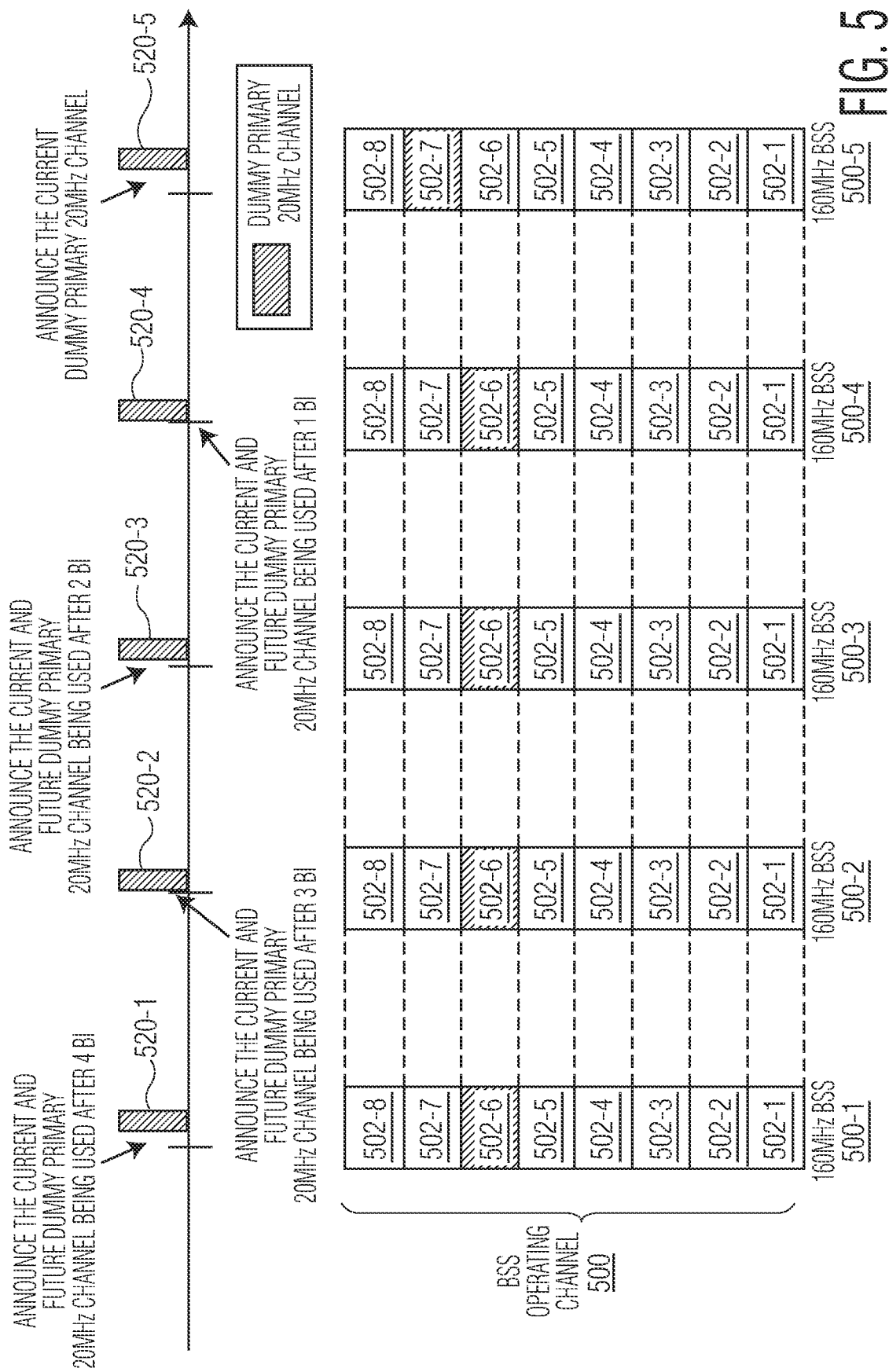
FIG. 5 illustrates an example of a technique for announcing a dummy primary 20 MHz channel in a BSS in accordance with an embodiment of the invention.

FIG. 5 illustrates an example of a technique for announcing an updated dummy primary 20 MHz channel in a BSS in accordance with an embodiment of the invention. With reference to FIG. 5, the dummy primary 20 MHz channel in a BSS operating channel 500 of the BSS is updated in response to a Beacon frame. In particular, FIG. 5 illustrates five Beacon frames, implemented as a first Beacon frame 520-1, a second Beacon frame 520-2, a third Beacon frame 520-3, a fourth Beacon frame 520-4, and a fifth Beacon frame 520-5 that announce the dummy primary 20 MHz channel of a 160 MHz BSS, a future dummy primary 20 MHz channel of the 160 MHz BSS, and a time at which the future dummy primary 20 MHz channel will be used by the 160 MHz BSS (e.g., a future Target Beacon Transmission Time (TBTT)). In some embodiments, a first wireless device (e.g., an AP) announces the future dummy primary 20 MHz channel and the time the future dummy primary 20 MHz channel may be used (e.g., the future TBTT). In such an embodiment, the 160 MHz BSS is shown as including eight 20 MHz channels, implemented as first 20 MHz channel 502-1, a second 20 MHz channel 502-2, a third 20 MHz channel 502-3, a fourth 20 MHz channel 502-4, a fifth 20 MHz channel 502-5, a sixth 20 MHz channel 502-6, a seventh 20 MHz channel 502-7, and an eighth 20 MHz channel 502-8.

With reference to FIG. 5, in some embodiments, the first Beacon frame 520-1 (in time sequence) may announce the current dummy primary 20 MHz channel in the 160 MHz BSS at a first time (shown by 160 MHz BSS 500-1) and the future dummy primary 20 MHz channel being used after four beacon intervals (BIs), such that the current dummy primary 20 MHz channel in the 160 MHz BSS 500-1 is the sixth 20 MHz channel 502-6. In some embodiments, the second Beacon frame 520-2 (in time sequence) may announce the current dummy primary 20 MHz channel in the 160 MHz BSS at a second time (shown by 160 MHz BSS 500-2) and the future dummy primary 20 MHz channel being used after three BIs, such that the current dummy primary 20 MHz channel in the 160 MHz BSS 500-2 is the sixth 20 MHz channel 502-6. In some embodiments, the third Beacon frame 520-3 (in time sequence) may announce the current dummy primary 20 MHz channel in the 160 MHz BSS at a third time (shown by 160 MHz BSS 500-3) and the future dummy primary 20 MHz channel being used after two BIs, such that the current dummy primary 20 MHz channel in the 160 MHz BSS 500-3 is the sixth 20 MHz channel 502-6. In some embodiments, the fourth Beacon frame 520-4 (in time sequence) may announce the current dummy primary 20 MHz channel in the 160 MHz BSS at a fourth time (shown by 160 MHz BSS 500-4) and the future dummy primary 20 MHz channel being used after one BI, such that the current dummy primary 20 MHz channel in the 160 MHz BSS 500-4 is the sixth 20 MHz channel 502-6. In some embodiments, the fifth Beacon frame 520-5 (in time sequence) may announce the current dummy primary 20 MHz channel in the 160 MHz BSS at a fifth time (shown by 160 MHz BSS 500-5), such that the current dummy primary 20 MHz channel in the 160 MHz BSS 500-5 is now the seventh 20 MHz channel 502-7.

In some embodiments, a second wireless device (e.g., a STA) parking in a subchannel which does not include the primary 20 MHz channel may use the dummy primary 20 MHz channel of the subchannel to perform medium access through backoff. In some embodiments, a first wireless device (e.g., an AP) may use the dummy primary 20 MHz channel in any subchannel (without including the primary 20 MHz channel) to perform the backoff. In some embodiments, changing a 20 MHz channel where backoff is performed may be announced by the AP or unannounced by the AP. In some embodiments, performing the backoff provides fairness between a STA which may cover the primary 20 MHz channel and a STA which may not cover the primary 20 MHz channel. In one embodiment, the dummy primary 20 MHz channel may be announced by the AP. In another embodiment, the dummy primary 20 MHz channel may be set by the AP to whichever 20 MHz channel may be closest to the primary 20 MHz channel (e.g., 20 MHz channel with smallest frequency difference).

Techniques for using 20 MHz channels in a BSS to perform backoff are described in further detail below with reference to FIG. 6.

Figure 6:
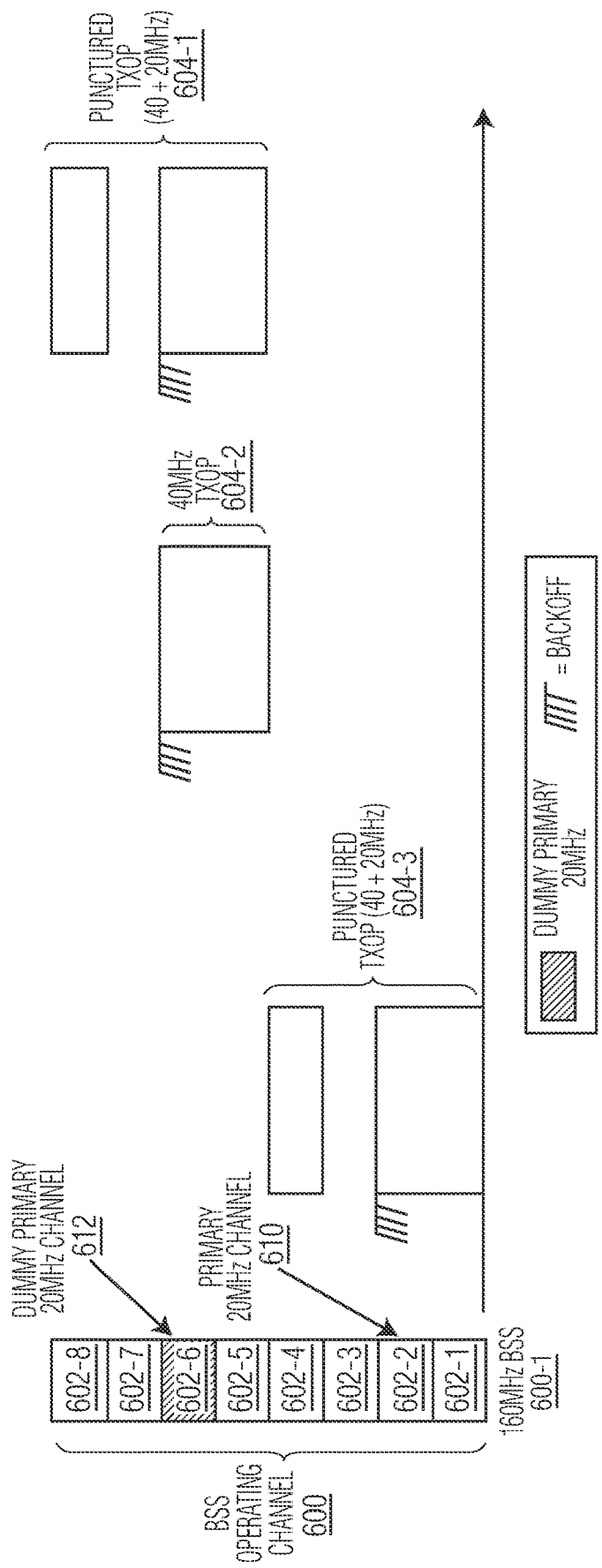
FIG. 6 illustrates examples of techniques for performing backoff in accordance with an embodiment of the invention.

FIG. 6 illustrates examples of techniques for performing backoff in accordance with an embodiment of the invention. With reference to FIG. 6, a BSS operating channel 600 of a 160 MHz BSS 600-1 is shown as including eight 20 MHz channels, implemented as a first 20 MHz channel 602-1, a second 20 MHz channel 602-2, a third 20 MHz channel 602-3, a fourth 20 MHz channel 602-4, a fifth 20 MHz channel 602-5, a sixth 20 MHz channel 602-6, a seventh 20 MHz channel 602-7, and an eighth 20 MHz channel 602-8. In some embodiments, the second 20 MHz channel 602-2 may be a primary 20 MHz channel 610 and the sixth 20 MHz channel 602-6 may be a dummy primary 20 MHz channel 612.

In some embodiments, a wireless device (e.g., an AP) (not shown) utilizing the BSS operating channel 600 of the 160 MHz BSS 600-1 may transmit PPDUs in TXOPs with dynamically punctured 20 MHz channels and use the primary 20 MHz channel 610 or the dummy primary 20 MHz channel 612 to do backoff. For example, FIG. 6 shows three TXOPs that the wireless device (e.g., the AP) initiates, implemented as a first Punctured TXOP (40+20 MHz) 604-1, a second Punctured TXOP 604-2, and a third Punctured TXOP (40+20 MHz) 604-3. In some embodiments, the AP uses the dummy primary 20 MHz 612 (e.g., the sixth 20 MHz channel 602-6) to perform backoff for the first Punctured TXOP (40+20 MHz) 604-1 and transmits a PPDU (not shown). In such an embodiment, the first punctured TXOP (40+20 MHz) 604-1 may include the eighth 20 MHz channel 602-8 and a 40 MHz segment made up of the fifth 20 MHz channel 602-5 and the sixth 20 MHz channel 602-6. In such an embodiment, the seventh 20 MHz channel 602-7 may be a punctured 20 MHz channel because the seventh 20 MHz channel 602-7 may not be the primary 20 MHz channel 610 or the dummy primary 20 MHz channel 612. In some embodiments, the AP uses the dummy primary 20 MHz 612 (e.g., the sixth 20 MHz channel 602-6) to perform backoff for the second Punctured TXOP (40 MHz) 604-2 and transmits a PPDU (not shown). In such an embodiment, the second punctured TXOP (40 MHz) 604-2 may include the 40 MHz segment made up of the fifth 20 MHz channel 602-5 and the sixth 20 MHz channel 602-6. In some embodiments, the AP uses the primary 20 MHz 610 (e.g., the second 20 MHz channel 602-2) to perform backoff for the third Punctured TXOP (40+20 MHz) 604-3 and transmits a PPDU (not shown). In such an embodiment, the third punctured TXOP (40+20 MHz) 604-3 may include the fourth 20 MHz channel 602-4 and a 40 MHz segment made up of the first 20 MHz channel 602-1 and the second 20 MHz channel 602-2. In such an embodiment, the third 20 MHz channel 602-3 may be a punctured 20 MHz channel because the third 20 MHz channel 602-3 may not be the primary 20 MHz channel 610 or the dummy primary 20 MHz channel 612.

In some embodiments, when a second wireless device (e.g., a STA) that parks in a subchannel that may not include the primary 20 MHz channel changes the STA's operating bandwidth, the STA's operating bandwidth may include the dummy primary 20 MHz channel. In some embodiments, when a second wireless device (e.g., a STA) announces the STA's operating bandwidth of the STA that parks in the subchannel that may not include the primary 20 MHz channel, the STA's operating bandwidth may include the dummy primary 20 MHz channel.

A technique for changing the operating bandwidth of the second wireless device (e.g., the STA) to include the dummy primary 20 MHz channel is described in further detail below with reference to FIG. 7.

Figure 7:
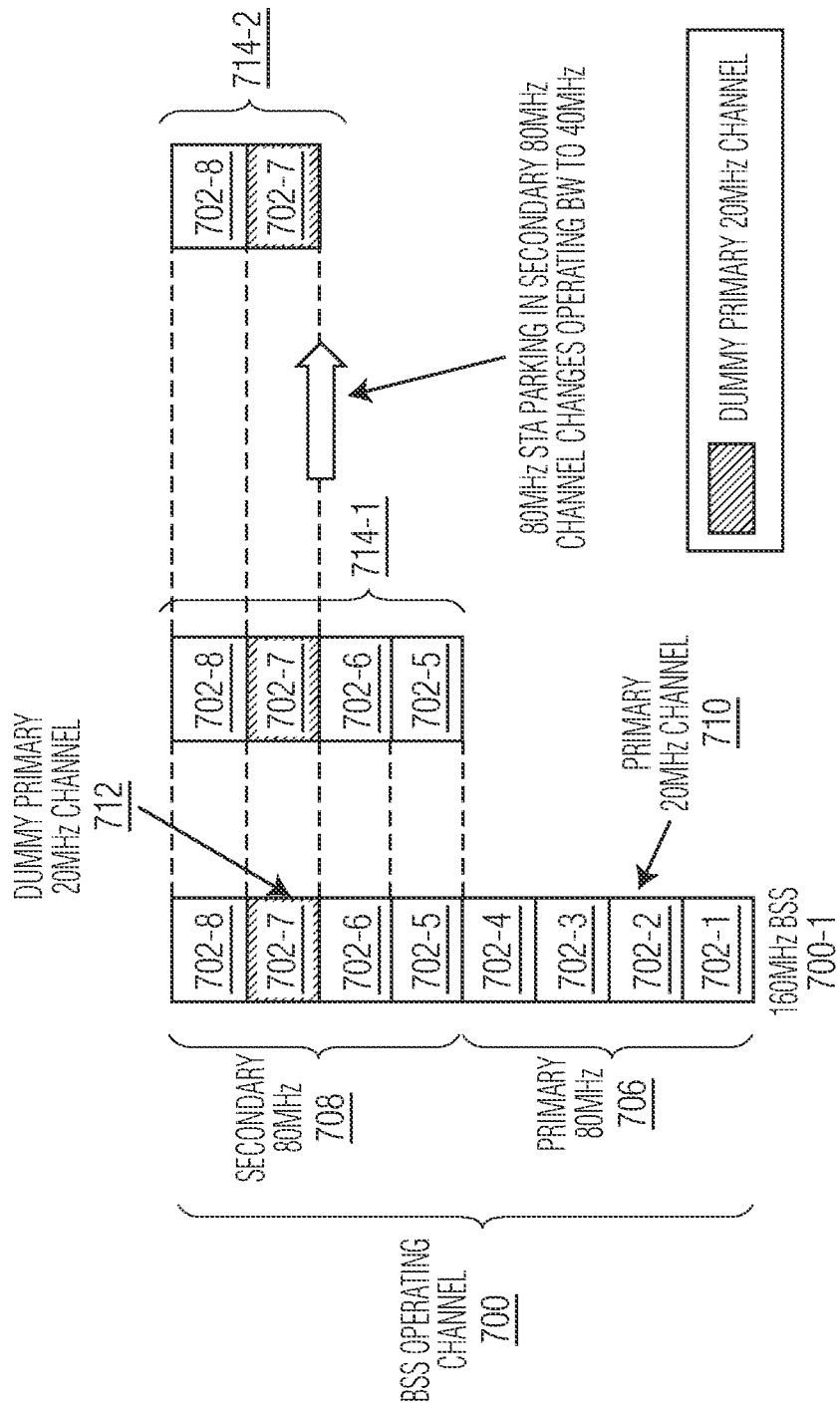
FIG. 7 illustrates an example of technique for changing a bandwidth of a wireless device in accordance with an embodiment of the invention.

FIG. 7 illustrates an example of technique for changing a bandwidth of a wireless device (e.g., a STA) in accordance with an embodiment of the invention. With reference to FIG. 7, a BSS operating channel 700 of a 160 MHz BSS 700-1 is shown as including eight 20 MHz channels which may be used by the wireless device (e.g., the STA) to change an operating bandwidth or a TXOP bandwidth. In particular, the eight 20 MHz channels of the BSS operating bandwidth 700 of the 160 MHz BSS 700-1 shown in FIG. 7 may be implemented as a first 20 MHz channel 702-1, a second 20 MHz channel 702-2, a third 20 MHz channel 702-3, a fourth 20 MHz channel 702-4, a fifth 20 MHz channel 702-5, a sixth 20 MHz channel 702-6, a seventh 20 MHz channel 702-7, and an eighth 20 MHz channel 702-8. In an embodiment, the BSS operating channel 700 of the 160 MHz BSS 700-1 features a primary 80 MHz subchannel 706 and a secondary 80 MHz subchannel 708. In such an embodiment, the primary 80 MHz subchannel 706 may include the first 20 MHz channel 702-1, the second 20 MHz channel 702-2, the third 20 MHz channel 702-3, and the fourth 20 MHz channel 702-4. In such an embodiment, the secondary 80 MHz subchannel 708 may include the fifth 20 MHz channel 702-5, the sixth 20 MHz channel 702-6, the seventh 20 MHz channel 702-7, and the eighth 20 MHz channel 702-8. In some embodiments, the second 20 MHz channel 702-2 may be a primary 20 MHz channel 710 and the seventh 20 MHz channel 702-7 may be a dummy primary 20 MHz channel 712.

With reference to FIG. 7, if the wireless device (e.g., the STA or second wireless device) parks in the secondary 80 MHz subchannel 708 (which does not include the primary 20 MHz channel 710), the wireless device may change the wireless device's operating bandwidth to include the dummy primary 20 MHz channel. For example, the wireless device may be an 80 MHz STA initially parked in the secondary 80 MHz subchannel 708 whose operating bandwidth may be an 80 MHz operating bandwidth 714-1, such that the 80 MHz operating bandwidth 714-1 may include the fifth 20 MHz channel 702-5, the sixth 20 MHz channel 702-6, the seventh 20 MHz channel 702-7 (e.g., the dummy primary 20 MHz channel 712), and the eighth 20 MHz channel 702-8. As another example, the 80 MHz STA with the 80 MHz operating bandwidth 714-1 may change the 80 MHz STA's operating bandwidth to a 40 MHz operating bandwidth 714-2, such that the 40 MHz operating bandwidth 714-2 may include the seventh 20 MHz channel 702-7 (e.g., the dummy primary 20 MHz channel 712) and the eighth 20 MHz channel 702-8.

In some embodiments, for each subchannel (e.g., the primary 80 MHz subchannel 706 or the secondary 80 MHz subchannel 708), first wireless devices (e.g., APs) may announce different operating parameters. Example of operating parameters may include Enhanced Distribution Channel Access (EDCA) parameters, MU EDCA parameters, and information regarding which 20 MHz channels may be statically punctured 20 MHz channels. In some embodiments, second wireless devices (e.g., STAs) parked in one subchannel (e.g., the primary 80 MHz subchannel 706 or the secondary 80 MHz subchannel 708) may use EDCA to access a medium.

A technique for TXOP protection described herein may be used in accordance with an embodiment of the invention. In some embodiments, in an enhanced Multi-User Request to Send (MU-RTS) frame, the first wireless device (e.g., AP) may allocate RUs for the second wireless device (e.g., STA) to transmit the second wireless device's non-HT duplicated Clear to Send (CTS) frame, such that the RUs for the second wireless device may include the subchannel that the STA parks on. In such an embodiment, the MU-RTS frame may be a soliciting frame and the CTS frame may be a responding frame. In some embodiments, the first wireless device transmits soliciting frames and the second wireless device transmits responding frames in the same TXOP. In some embodiments, the responding frames may be included in a PPDU whose bandwidth may be narrower than a PPDU that includes the soliciting frames. In some embodiments, the second wireless device (e.g., STA) transmits the CTS frame if an RU allocated to the second wireless device is idle. In some embodiments, the first wireless device (e.g., AP) may detect the CTS frame in one subchannel, e.g., the CTS frame may be detected in the primary 80 MHz subchannel when the MU-RTS frame is transmitted in a 320 MHz channel. In one embodiment, if the first wireless device does not detect the CTS frame, then the first wireless device may double the first wireless device's contention window (CW), unless CW is the same as a maximum CW, CWmax. In another embodiment, if the first wireless device detects the CTS frame, then the first wireless device may transmit subsequent frames by using an entire bandwidth of the enhanced MU-RTS frame. In some embodiments, if the second wireless device transmits the CTS frame, but does not receive a following PPDU from the first wireless device, then the second wireless device may transmit a contention free end (CF-End) frame to release the medium. In such an embodiment, transmission of the CF-End frame may be after backoff or without backoff, e.g., after aSIFSTime+aSlotTime+aRxPHYStart-Delay. Such an embodiment may also involve the medium being idle for CF-End transmission.

The technique for TXOP protection may also involve the first wireless device (e.g., AP) and the second wireless device (e.g., STA) reporting and/or monitoring Overlapping Basic Service Set (OBSS) devices. For example, the second wireless device may report whether an OBSS device operating in accordance with the 802.11a/b/g/n/ac/ax communication protocols has been detected. As another example, the first wireless device may monitor whether an OBSS device operating in accordance with the 802.11a/b/g/n/ac/ax communication protocols has been detected.

In some embodiments, there may be no OBSS devices operating in accordance with the 802.11a/b/g/n/ac communication protocols or no associated second wireless devices operating in accordance with the 802.11a/b/g/n/ac communication protocols. In such an embodiment, a Trigger+Quality of Service (QoS) Null with valid duration in a High-Efficiency Signal A (HE-SIG A) field may be used to protect the TXOP, such that QoS Null may be used to report the second wireless device's idle 20 MHz channels for dynamic bandwidth negotiation. Furthermore, in such an embodiment, the OBSS device and associated devices operating in accordance with 802.11a/b/g/n/ac communication protocols may be decided per subchannel, such that if there are no OBSS devices operating in accordance with 802.11a/b/g/n/ac communication protocols and no associated devices operating in accordance with 802.11a/b/g/n/ac communication protocols, then the subchannel may be protected by the HE-SIG A field.

In some embodiments, there may be no OBSS devices operating in accordance with the 802.11a/b/g/n/ax communication protocols or no associated second wireless devices operating in accordance with the 802.11a/b/g/n/ax communication protocols. In such an embodiment, a Trigger+QoS Null with valid duration in a EHT signal (EHT-SIG) field may be used to protect the TXOP, such that QoS Null may be used to report the second wireless device's idle 20 MHz channels for dynamic bandwidth negotiation. Furthermore, in such an embodiment, the OBSS device and associated devices operating in accordance with 802.11a/b/g/n/ax communication protocols may be decided per subchannel, such that if there are no OBSS devices operating in accordance with 802.11a/b/g/n/ax communication protocols and no associated devices operating in accordance with 802.11a/b/g/n/ax communication protocols, then the subchannel may be protected by the EHT-SIG field.

As an alternative to using a dummy primary 20 MHz channel when operating a BSS, the first wireless device may use multiple primary 20 MHz channels. In some embodiments, for each subchannel (e.g., each 80 MHz subchannel of a BSS operating channel) one primary 20 MHz channel may be defined.

A technique for operating a BSS that involves utilizing primary channels for each subchannel is described in further detail below with reference to FIG. 8.

Figure 8:
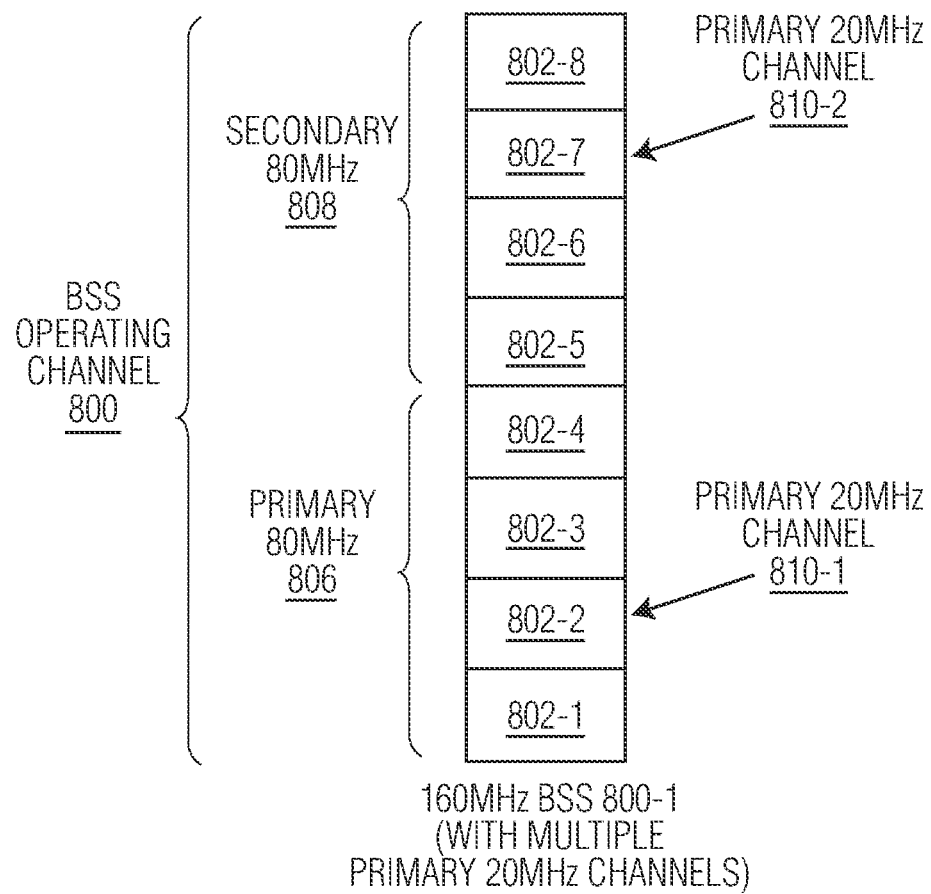
FIG. 8 depicts another example of a technique for operating a BSS in accordance with an embodiment of the invention.

FIG. 8 depicts another example of a technique for operating a BSS in accordance with an embodiment of the invention. With reference to FIG. 8, a 160 MHz BSS 800-1 is shown as including a BSS operating channel 800 that includes eight 20 MHz channels, a primary 80 MHz subchannel 806, a secondary 80 MHz subchannel 808, a first primary 20 MHz channel 810-1, and a second primary 20 MHz channel 810-2. In particular, the eight 20 MHz channels of the 160 MHz BSS 800-1 shown in FIG. 8 may be implemented as a first 20 MHz channel 802-1, a second 20 MHz channel 802-2, a third 20 MHz channel 802-3, a fourth 20 MHz channel 802-4, a fifth 20 MHz channel 802-5, a sixth 20 MHz channel 802-6, a seventh 20 MHz channel 802-7, and an eighth 20 MHz channel 802-8. In such an embodiment, the primary 80 MHz subchannel 806 may include the first 20 MHz channel 802-1, the second 20 MHz channel 802-2, the third 20 MHz channel 802-3, and the fourth 20 MHz channel 802-4. In such an embodiment, the secondary 80 MHz subchannel 808 may include the fifth 20 MHz channel 802-5, the sixth 20 MHz channel 802-6, the seventh 20 MHz channel 802-7, and the eighth 20 MHz channel 802-8. In some embodiments, the second 20 MHz channel 802-2 may be the first primary 20 MHz channel 810-1 and the seventh 20 MHz channel 802-7 may be the second primary 20 MHz channel 810-2.

With reference to FIG. 8, in some embodiments, the first wireless device (e.g., AP) (not shown) may transmit beacons in each primary 20 MHz channel (e.g., the first primary 20 MHz channel 810-1 and/or the second primary 20 MHz channel 810-2) of the 160 MHz BSS 800-1. In such an embodiment, the first wireless device may transmit beacons in one or more primary 20 MHz channel(s) in non-HT/HT/Very High Throughput (VHT)/HE PPDUs for second wireless devices that may be associated with the first wireless device and may be operating in accordance with the 802.11a/b/g/n/ac/ax communication protocols. Furthermore, in such an embodiment, beacons may be carried in EHT PPDUs in other primary 20 MHz channels. In another embodiment, non-HT PPDUs may be used to carry beacons in each of the primary 20 MHz channels (e.g., all of the primary 20 MHz channels) of the BSS. In such an embodiment, Supported Rates and a BSS Membership Selectors element (e.g., a BSS membership selector that may not include an EHT second wireless device) in one or more primary 20 MHz channels may allow legacy second wireless devices to associate with the first wireless device. Furthermore, in such an embodiment, Supported Rates and the BSS Membership Selectors element (e.g., a BSS membership selector that may include the EHT second wireless device) in other primary 20 MHz channels may allow the EHT second wireless device to associate with the first wireless device. In some embodiments, the first wireless device may use one of the primary 20 MHz channels (e.g., the first primary 20 MHz channel 810-1 or the second primary 20 MHz channel 810-2) to perform backoff at any time. In some embodiments, the first wireless device may allow the second wireless device's (e.g., STA's) EDCA operation in one primary 20 MHz channel at any time.

As an alternative to using a dummy primary 20 MHz channel or multiple primary 20 MHz channels when operating a BSS, the first wireless device may negotiate and/or announce a dummy primary 20 MHz channel at which to start PPDU decoding for each subchannel that may not include the primary 20 MHz channel. In one embodiment, an announced dummy primary 20 MHz channel of a subchannel may be the same for each STA parked in the subchannel. In such an embodiment, the announcement may be carried in a BSS operation element. In another embodiment, a negotiated dummy primary 20 MHz channel of a subchannel for a STA parked in the subchannel may be different from the negotiated 20 MHz channel of the subchannel for another STA parked in the subchannel. In some embodiments, the second wireless devices that may be parked in a subchannel which may not include the primary 20 MHz channel may negotiate and/or announce the 20 MHz channel at which to start PPDU decoding. In some embodiments, the first wireless device may schedule different second wireless devices based on punctured 20 MHz channels and the second wireless device's negotiation and/or announcement.

A technique for operating a BSS that involves negotiating the 20 MHz channel at which to start PPDU decoding is described in further detail below with reference to FIG. 9.

Figure 9:
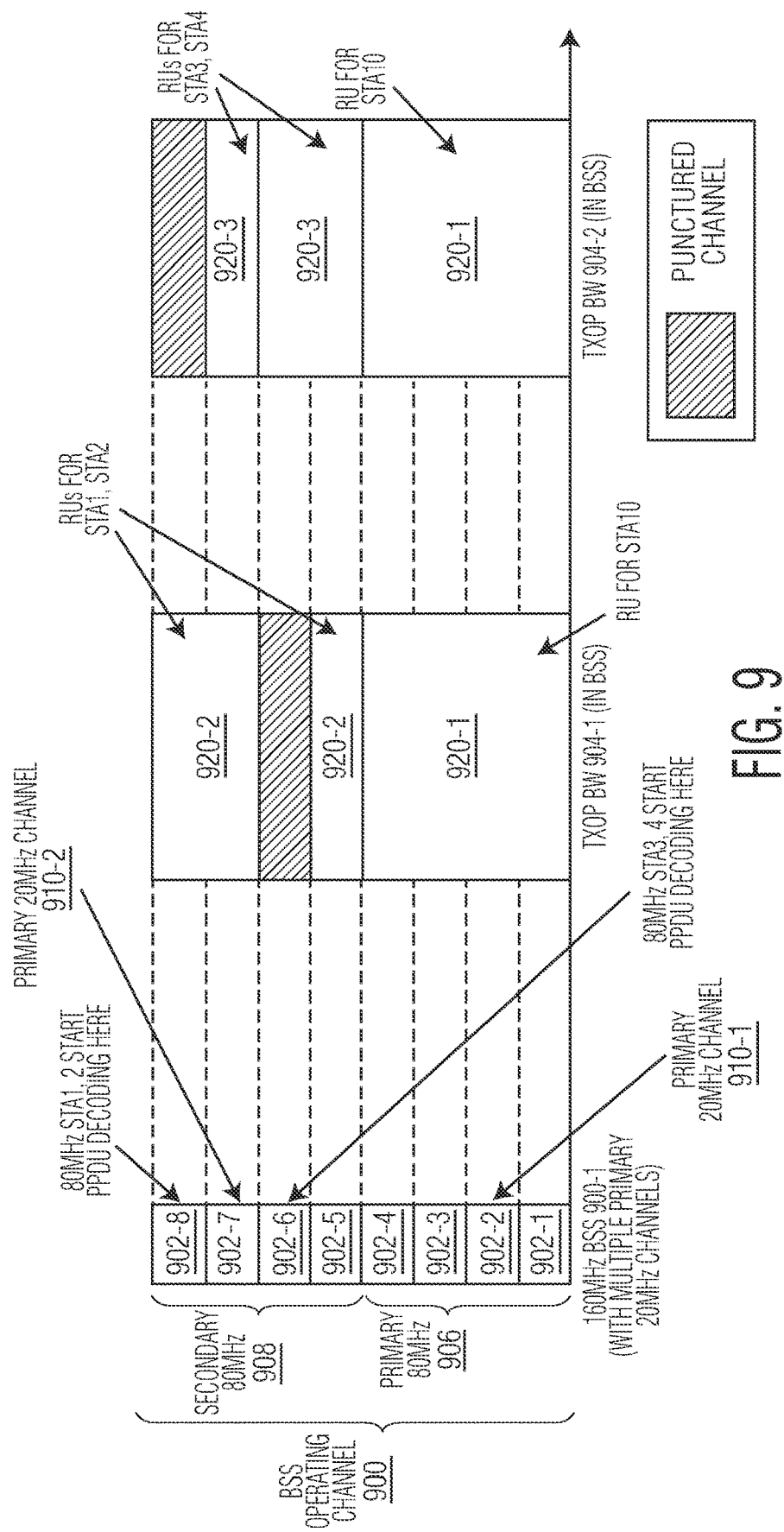
FIG. 9 depicts another example of a technique for operating a BSS in accordance with an embodiment of the invention.

FIG. 9 depicts another example of a technique for operating a BSS in accordance with an embodiment of the invention. With reference to FIG. 9, a BSS operating channel 900 of a 160 MHz BSS 900-1 is shown as including eight 20 MHz channels, a primary 80 MHz subchannel 906, a secondary 80 MHz subchannel 908, a first primary 20 MHz channel 910-1, a second primary 20 MHz channel 910-2, and PPDUs in TXOP BWs that correspond with features of the 160 MHz BSS 900-1. In particular, the eight 20 MHz channels of the BSS operating channel 900 of the 160 MHz BSS 900-1 shown in FIG. 9 may be implemented as a first 20 MHz channel 902-1, a second 20 MHz channel 902-2, a third 20 MHz channel 902-3, a fourth 20 MHz channel 902-4, a fifth 20 MHz channel 902-5, a sixth 20 MHz channel 902-6, a seventh 20 MHz channel 902-7, and an eighth 20 MHz channel 902-8. In such an embodiment, the primary 80 MHz subchannel 906 may include the first 20 MHz channel 902-1, the second 20 MHz channel 902-2, the third 20 MHz channel 902-3, and the fourth 20 MHz channel 902-4. In such an embodiment, the secondary 80 MHz subchannel 908 may include the fifth 20 MHz channel 902-5, the sixth 20 MHz channel 902-6, the seventh 20 MHz channel 902-7, and the eighth 20 MHz channel 902-8. In some embodiments, the second 20 MHz channel 902-2 may be the first primary 20 MHz channel 910-1 and the seventh 20 MHz channel 902-7 may be the second primary 20 MHz channel 910-2. In some embodiments, an 80 MHz STA1 (not shown) and an 80 MHz STA2 (not shown) parked in the secondary 80 MHz subchannel 908 may start decoding at the eighth 20 MHz channel 902-8, such that the eighth 20 MHz channel 902-8 may be a non-punctured 20 MHz of STA1 and STA2. In some embodiments, an 80 MHz STA3 (not shown) and an 80 MHz STA4 (not shown) parked in the secondary 80 MHz subchannel may start decoding at the sixth 20 MHz channel 902-6, such that the sixth 20 MHz channel 902-6 may be the non-punctured 20 MHz channel of STA3 and STA4.

With reference to FIG. 9, in some embodiments, a first TXOP BW 904-1 may include sections for transmitting a PPDU, implemented as a first PPDU section 920-1 and a second PPDU section 920-2. In such an embodiment, the PPDU may also be a single Trigger-Based (TB) PPDU or a non-HT duplicate PPDU. In such an embodiment, the first PPDU section 920-1 may be transmitted on aggregated 20 MHz channels of the primary 80 MHz subchannel 906, such that the first PPDU section 920-1 may carry RUs for an 80 MHz STA10 (not shown). Furthermore, in such an embodiment, the second PPDU section 920-2 may be transmitted on the fifth 20 MHz channel 902-5 and on a 40 MHz segment that aggregates the eighth 20 MHz channel 902-8 and the seventh 20 MHz channel 902-7, but may puncture the sixth 20 MHz channel 902-6 because the second PPDU section 920-2 carries RUs for the 80 MHz STA1 and the 80 MHz STA2 which start decoding PPDUs at the eighth 20 MHz channel 902-8.

With further reference to FIG. 9, in some embodiments, a second TXOP BW 904-2 may include sections for transmitting the PPDU, implemented as the first PPDU section 920-1 and a third PPDU section 920-3. In such an embodiment, the PPDU may also be a single TB PPDU or a non-HT duplicate PPDU. In such an embodiment, the first PPDU section 920-1 may be transmitted on aggregated 20 MHz channels of the primary 80 MHz subchannel 906, such that the first PPDU section 920-1 may carry RUs for the 80 MHz STA10 (not shown). Furthermore, in such an embodiment, the third PPDU section 920-3 may be transmitted on the seventh 20 MHz channel 902-7 and on a 40 MHz segment that aggregates the fifth 20 MHz channel 902-5 and the sixth 20 MHz channel 902-6, but may puncture the eighth 20 MHz channel 902-8 because the third PPDU section 920-3 carries RUs for the 80 MHz STA3 and the 80 MHz STA4 which start decoding PPDUs at the sixth 20 MHz channel 902-6.

In some embodiments, timing at which the second wireless device (e.g., STA) may park in a negotiated 20 MHz channel may involve one of three parking techniques described herein.

According to a first parking technique, some embodiments may involve the second wireless device parking in a negotiated subchannel and a dummy primary 20 MHz channel after a negotiation. In such an embodiment, the first parking technique may also involve the negotiation being done via a separate management frame or via an Association Request/Response, such that in the Association Response to the second wireless device, the first wireless device (e.g., AP) may indicate the subchannel and the dummy primary 20 MHz channel that the second wireless device parks in. In another embodiment, the first parking technique may involve the second wireless device receiving a beacon and/or a Probe Response in the negotiated subchannel and the dummy primary 20 MHz channel, such that the second wireless device may not need to switch to the primary 20 MHz channel to receive the beacon.

According to a second parking technique, some embodiments may involve the second wireless device (e.g., STA) parking in the negotiated subchannel and the dummy primary 20 MHz channel except at a TBTT or at a selected TBTT after the negotiation. In such an embodiment, the second technique may also involve the negotiation being done via the separate management frame or via the Association Request/Response, such that in the Association Response to the second wireless device, the first wireless device (e.g., AP) may indicate the subchannel and the dummy primary 20 MHz channel that the second wireless device parks in. In some embodiments, the second wireless device may receive the beacon in the primary 20 MHz channel.

According to a third parking technique, some embodiments may involve the second wireless device (e.g., STA) parking in the negotiated subchannel and the dummy primary 20 MHz channel at a specific TWT service period (SP). In such an embodiment, the third parking technique may involve a TWT negotiation that may be used with an updated TWT Channel field, e.g., via a TWT Subchannel Selective Transmission (SST). Furthermore, in such an embodiment, the updated TWT Channel field may be extended to 16-bits (each bit indicates a 20 MHz channel), or for a BSS operating bandwidth greater than 160 MHz, each bit may indicate a 40 MHz channel.

According to a fourth parking technique, some embodiments may involve a first wireless device (e.g., AP) announcing a dummy primary 20 MHz channel for each subchannel which may not include a primary 20 MHz channel. The fourth parking technique also involves the second wireless device negotiating the parking subchannel, in which each STA parked in the subchannel may have the same dummy primary 20 MHz channel.

In some embodiments, when the first wireless device (e.g., AP) with a first bandwidth capability and a first transmission power capability transmits a PPDU to the second wireless device (e.g., STA) with a second bandwidth (e.g., 160 MHz or 320 MHz) capability that may be the same as the first bandwidth capability and with a second transmission power capability that is less than the first transmission power capability of the first wireless device, the responding frame in the same bandwidth transmitted by the second wireless device may not be able to reach the first wireless device (e.g., the first wireless device may not be able to decode the responding frame). In such an embodiment, one solution may involve the responding frame being transmitted in narrower bandwidth than the bandwidth of a soliciting PPDU. In one embodiment, one restriction may be that the responding frame with narrower bandwidth may be the last transmission of a TXOP. In another embodiment, the responding frame with narrower bandwidth may be in a TXOP protected by an (MU-)RTS frame and a CTS frame in a non-HT duplicate PPDU.

In one embodiment, a TXOP holder may decide the bandwidth and operating parameters for a responding frame transmitted by a TXOP responder, such that the responding frame may be transmitted in a narrower bandwidth. In such an embodiment, the TXOP responder (e.g., STA) transmits the responding frame in an EHT/HE TB PPDU. In some embodiments, the TXOP responder may decide the bandwidth and operating parameters for the responding frame. In such an embodiment, the responding frame may be transmitted in the narrower bandwidth and a PPDU may be a VHT/HE/EHT PPDU, and in which there may be less transmission time when a non-HT duplicate PPDU is used. In some embodiments, the TXOP holder may be the first wireless device (e.g., AP) and the TXOP responder may be the second wireless device (e.g., STA). In some embodiments, the first wireless device may transmit a Trigger frame to solicit the responding frame in a TB PPDU, such that the Trigger frame may announce the narrower bandwidth for the TB PPDU. In some embodiments, the first wireless device may transmit trigger information in an HE Control field or a triggered response scheduling (TRS) field to solicit the responding frame in the TB PPDU, such that the trigger information may announce the narrower bandwidth for the TB PPDU.

A technique for operating a BSS that involves the first wireless device announcing the bandwidth and operating parameters for the responding frame transmitted by the second wireless device is described in further detail below with reference to FIG. 10.

Figure 10:
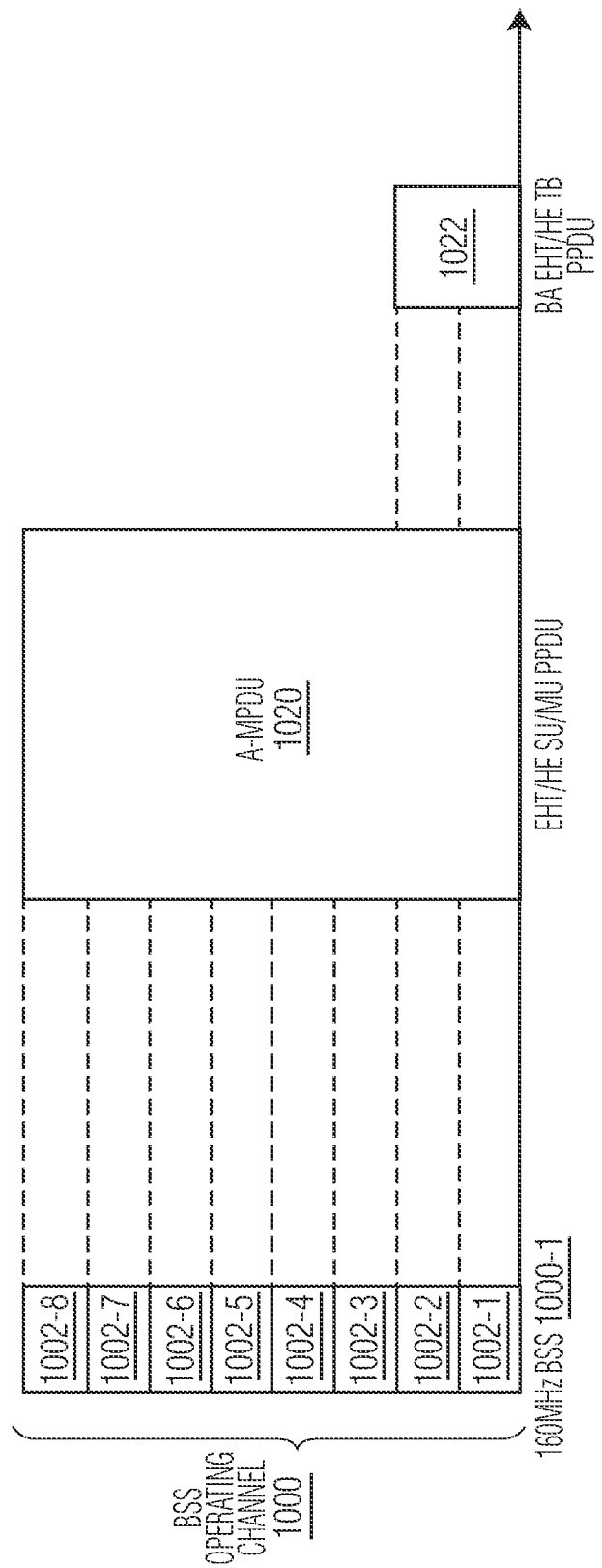
FIG. 10 depicts another example of a technique for operating a BSS in accordance with an embodiment of the invention.

FIG. 10 depicts another example of a technique for operating a BSS in accordance with an embodiment of the invention. With reference to FIG. 10, a BSS operating channel 1000 of a 160 MHz BSS 1000-1 is shown as including eight 20 MHz channels and PPDUs that correspond with features of the BSS operating channel 1000. In particular, the eight 20 MHz channels of the BSS operating channel 1000 of the 160 MHz BSS 1000-1 shown in FIG. 10 may be implemented as a first 20 MHz channel 1002-1, a second 20 MHz channel 1002-2, a third 20 MHz channel 1002-3, a fourth 20 MHz channel 1002-4, a fifth 20 MHz channel 1002-5, a sixth 20 MHz channel 1002-6, a seventh 20 MHz channel 1002-7, and an eighth 20 MHz channel 1002-8.

With reference to FIG. 10, in some embodiments, a soliciting frame, e.g., an Aggregated-MAC Protocol Data Unit (A-MPDU) 1020 may be transmitted by a first wireless device (not shown) to a second wireless device (not shown) to solicit a responding frame, e.g., in a TB PPDU, implemented as a Block Acknowledgement (BA) frame in the TB PPDU (e.g., BA EHT/HE TB PPDU 1022). In such an embodiment, the first wireless device and the second wireless device may be using the BSS operating channel 1000 of the 160 MHz BSS 1000-1 for frame exchange. In such an embodiment, the A-MPDU 1020 may be an EHT/HE SU/MU PPDU that includes a Trigger frame (not shown) which announces the narrower bandwidth and operating parameters for the responding frame in the TB PPDU. Furthermore, in such an embodiment, the A-MPDU 1020 may announce that the narrower bandwidth of the responding EHT/HE TB PPDU may be 40 MHz, causing the BA in BA EHT/HE TB PPDU 1022 to be transmitted on two 20 MHz channels (equivalent to 40 MHz) of the 160 MHz BSS 1000-1 that includes a primary 20 MHz channel (e.g., the first 20 MHz channel 1002-1 and the second 20 MHz channel 1002-2).

In some embodiments, the first wireless device (e.g., AP) may transmit a mixed PPDU with multiple SUB-PPDUs that may start and end at the same time with each SUB-PPDU in a separate subchannel (e.g., 80 MHz subchannel, 160 MHz subchannel, other bandwidth, etc.), such that the mixed PPDU may have mixed PPDU formats. In some embodiments, the first wireless device may transmit SUB-PPDUs with the same format that may start and end at the same time with each SUB-PPDU in a separate subchannel. In some embodiments, the first wireless device may schedule mixed TB SUB-PPDUs (e.g., HE TB SUB-PPDU+EHT SUB-PPDU) that may start and end at the same time with each SUB-PPDU in a separate subchannel. In some embodiments, second wireless devices (e.g., STAs) may park in different subchannels after association with the first wireless device.

Examples of mixed PPDUs and mixed PPDUs with SUB-PPDUs that may be transmitted by a wireless device in a BSS are described in further detail below with reference to FIGS. 11A-11C.

Figure 11A:
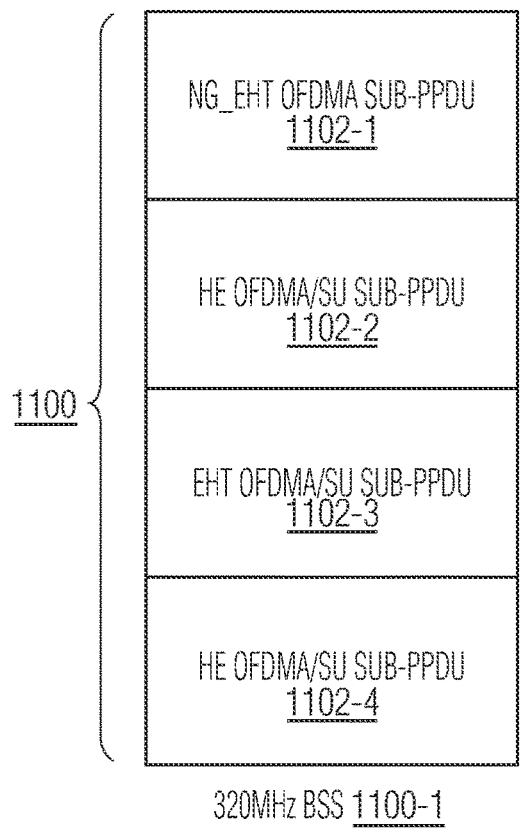
FIG. 11A depicts an example of a BSS that is used to transmit Physical Layer Protocol Data Units (PPDUs).

FIG. 11A depicts an example of a BSS that is used to transmit PPDUs. With reference to FIG. 11A, a BSS operating channel 1100 of a 320 MHz BSS 1100-1 is shown as including four 80 MHz subchannels that may be used to transmit a 320 MHz PPDU with mixed PPDU format. In particular, FIG. 11A depicts four 80 MHz subchannels, implemented as a first 80 MHz subchannel 1102-1, a second 80 MHz subchannel 1102-2, a third 80 MHz subchannel 1102-3, and a fourth 80 MHz subchannel 1102-4 which may each be used to transmit SUB-PPDUs of a down-link (DL) PPDU with mixed PPDU format (acknowledgement is not shown). In such an embodiment, the first 80 MHz subchannel 1102-1 may be used to transmit a DL SUB-PPDU with a next-generation EHT (NG_EHT) Orthogonal Frequency-Division Multiple Access (OFDMA) format, the second 80 MHz subchannel 1102-2 may be used to transmit a DL SUB-PPDU with an HE OFDMA/SU format, the third 80 MHz subchannel 1102-3 may be used to transmit a DL SUB-PPDU with an EHT OFDMA/SU format, and the fourth 80 MHz subchannel may be used to transmit a DL SUB-PPDU with the HE OFDMA/SU format. In some embodiments, the DL PPDU with mixed PPDU format may include SUB-PPDUs with different formats transmitted in different channel segments. In some embodiments, the BSS operating channel 1100 may be less than 320 MHz.

Figure 11B:
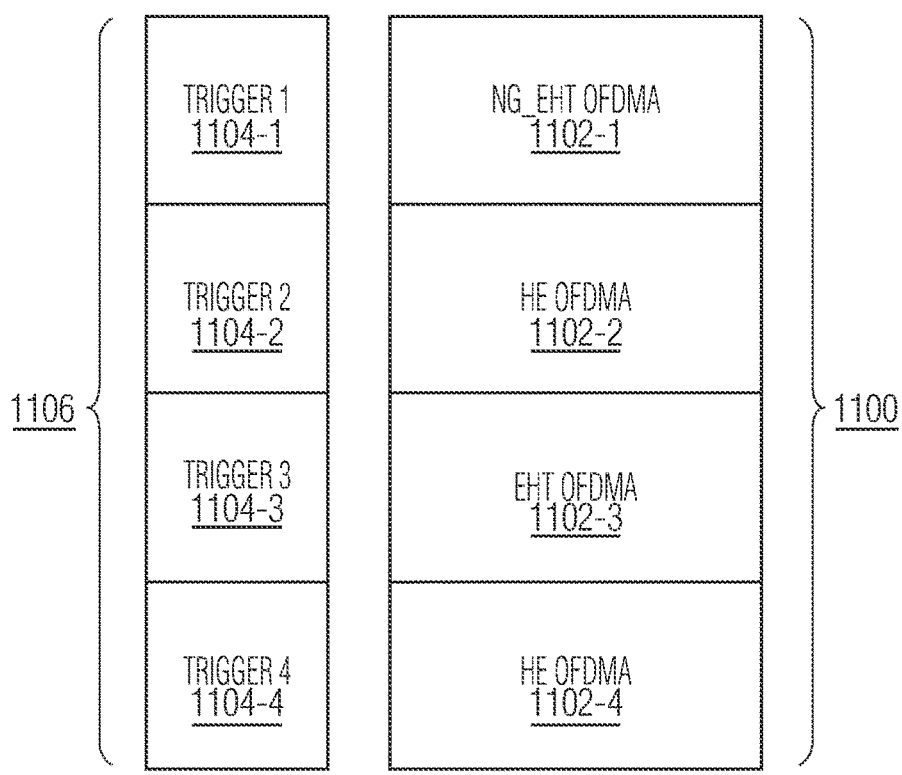
FIG. 11B depicts another example of a BSS that is used to transmit PPDUs.

FIG. 11B depicts another example of a BSS that is used to transmit PPDUs. With reference to FIG. 11B, the BSS operating channel 1100 of the 320 MHz BSS 1100-1 is shown as including four 80 MHz subchannels that may be used to transmit a PPDU with mixed PPDU format. In particular, FIG. 11B depicts four 80 MHz subchannels, implemented as the first 80 MHz subchannel 1102-1, the second 80 MHz subchannel 1102-2, the third 80 MHz subchannel 1102-3, and the fourth 80 MHz subchannel 1102-4 which may each be used to transmit SUB-PPDUs of an up-link (UL) PPDU with mixed PPDU format in response to Trigger frames included in a DL PPDU 1106. In such an embodiment, the first 80 MHz subchannel 1102-1 may be used to transmit an UL SUB-PPDU with the NG_EHT OFDMA format in response to a first trigger frame, e.g., Trigger1 1104-1. In such an embodiment, the second 80 MHz subchannel 1102-2 may be used to transmit an UL SUB-PPDU with an HE OFDMA format in response to a second trigger frame, e.g., Trigger2 1104-2. In such an embodiment, the third 80 MHz subchannel 1102-3 may be used to transmit an UL SUB-PPDU with an EHT OFDMA format in response to a third trigger frame, e.g., Trigger3 1104-3. In such an embodiment, the fourth 80 MHz subchannel may be used to transmit an UL SUB-PPDU with the HE OFDMA format in response to a fourth trigger frame, e.g., Trigger4 1104-4.

Figure 11C:
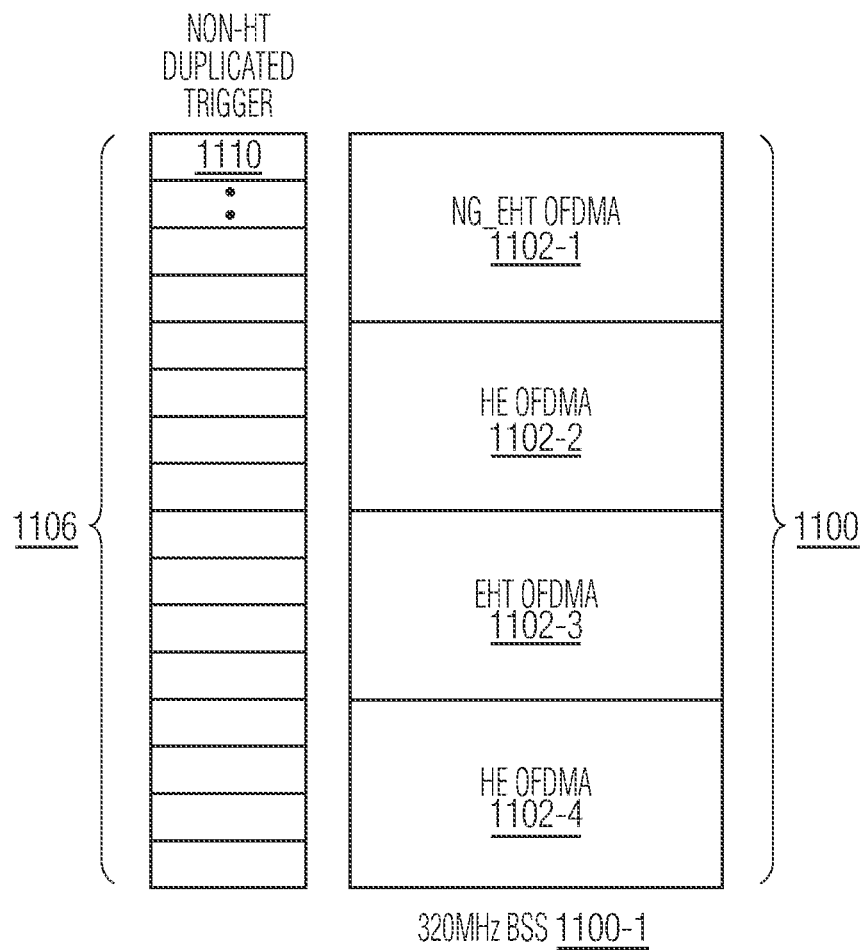
FIG. 11C depicts another example of a BSS that is used to transmit PPDUs.

FIG. 11C depicts another example of a BSS that is used to transmit PPDUs. With reference to FIG. 11C, the BSS operating channel 1100 of the 320 MHz BSS 1100-1 is shown as including four 80 MHz subchannels that may be used to transmit a PPDU with mixed PPDU format. In particular, FIG. 11C depicts four 80 MHz subchannels, implemented as the first 80 MHz subchannel 1102-1, the second 80 MHz subchannel 1102-2, the third 80 MHz subchannel 1102-3, and the fourth 80 MHz subchannel 1102-4 which may each be used to transmit SUB-PPDUs of the UL PPDU with mixed PPDU format in response to a non-HT duplicated Trigger 1110 included in the DL PPDU 1106 (acknowledgement is not shown). In such an embodiment, the non-HT duplicated Trigger 1110 included in the DL PPDU 1106 may be repeated across each 20 MHz channel of the BSS operating channel 1100. In such an embodiment, the first 80 MHz subchannel 1102-1 may be used to transmit an UL SUB-PPDU with the NG_EHT OFDMA format in response to the non-HT duplicated Trigger 1110, the second 80 MHz subchannel 1102-2 may be used to transmit an UL SUB-PPDU with the HE OFDMA format in response the non-HT duplicated Trigger 1110, the third 80 MHz subchannel 1102-3 may be used to transmit an UL SUB-PPDU with the EHT OFDMA format in response to the non-HT duplicated Trigger 1110, and the fourth 80 MHz subchannel may be used to transmit an UL SUB-PPDU with the HE OFDMA format in response to the non-HT duplicated Trigger 1110.

In some embodiments, wireless devices may utilize the BSS operating channel to perform simultaneous subchannel sounding. For example, the first wireless device (e.g., AP) may transmit different Null Data Packet Announcements (NDPAs) and Null Data Packets (NDPs) to the second wireless device (e.g., STA) to solicit feedback. In some embodiments, NDPs may have different PPDU formats (e.g., HE NDP, EHT NDP, NG_EHT NDP, etc.). As another example, the first wireless device may transmit Beam Forming Report Poll (BFRP) Triggers in different subchannels to solicit sounding feedback from second wireless devices parked on different subchannels. In some embodiments, the BFRP Triggers may solicit full or partial subchannel bandwidth MU/SU sounding feedback and/or full or partial subchannel bandwidth Channel Quality Indicator (CQI) feedback.

A BSS being used to perform simultaneous subchannel sounding is described in further detail below with reference to FIG. 12.

Figure 12:
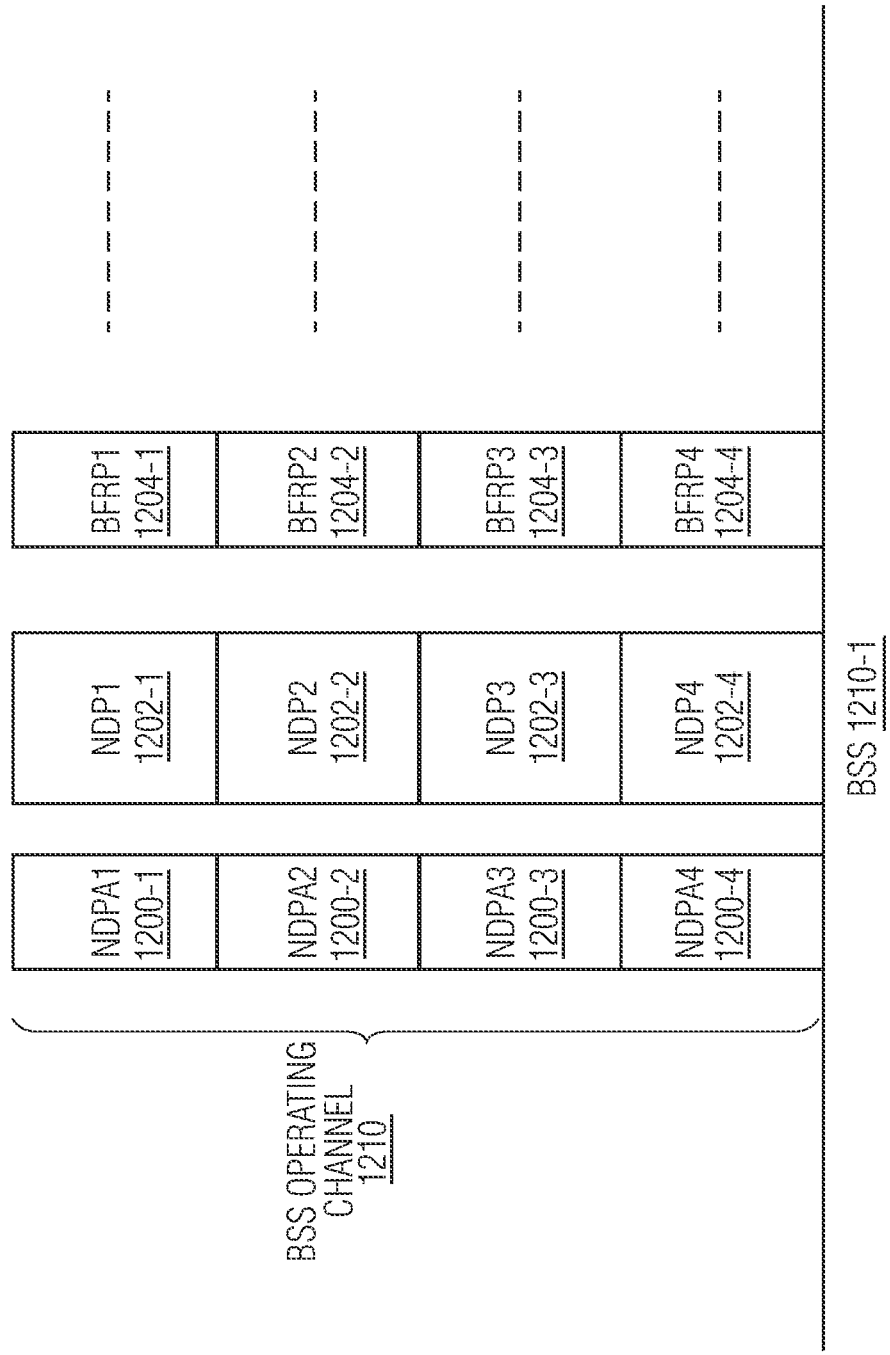
FIG. 12 depicts an example of a BSS that is used for subchannel sounding.

FIG. 12 depicts an example of a BSS that is used for subchannel sounding. With reference to FIG. 12, a BSS operating channel 1210 of a BSS 1210-1 is shown as including four subchannels being used to transmit NDPAs, NDPs, and BFRPs as part of simultaneous subchannel sounding. In particular, FIG. 12 depicts a first subchannel (shown by the top row of the BSS operating channel 1210) that a first NDPA, e.g., NDPA1 1200-1, a first NDP, e.g., NDP1 1202-1, and a first BFRP, e.g., BFRP1 1204-1 may be transmitted on, a second subchannel (shown by the second from the top row of the BSS operating channel 1210) that a second NDPA, e.g., NDPA2 1200-2, a second NDP, e.g., NDP2 1202-2, and a second BFRP, e.g., BFRP2 1204-2 may be transmitted on, a third subchannel (shown by the second from the bottom row of the BSS operating channel 1210) that a third NDPA, e.g., NDPA3 1200-3, a third NDP, e.g., NDP3 1202-3, and a third BFRP, e.g., BFRP3 1204-3 may be transmitted on, and a fourth subchannel (shown by the bottom row of the BSS operating channel 1210) that a fourth NDPA, e.g., NDPA4 1200-4, a fourth NDP, e.g., NDP4 1202-4, and a fourth BFRP, e.g., BFRP4 1204-4 may be transmitted on.

In some embodiments, wireless devices may utilize the BSS operating channel to perform independent subchannel sounding. For example, the first wireless device (e.g., AP) may transmit different NDPAs and NDPs to the second wireless device (e.g., STA) in one subchannel of the BSS, such that the subchannel may or may not include the primary 20 MHz channel. In some embodiments, NDPs may solicit full/partial subchannel bandwidth MU/SU sounding feedback or full/partial subchannel bandwidth CQI feedback. In some embodiments, the first wireless device may be a beamformer which may switch from one subchannel to another subchannel to perform backoff and independent subchannel sounding. In some embodiments, in the subchannel where the second wireless device's EDCA medium access may be allowed by the first wireless device, the second wireless device may be the beamformer which may perform SU sounding with the first wireless device after backoff.

A BSS being used to perform independent subchannel sounding is described in further detail below with reference to FIGS. 13A-13B.

Figure 13A:
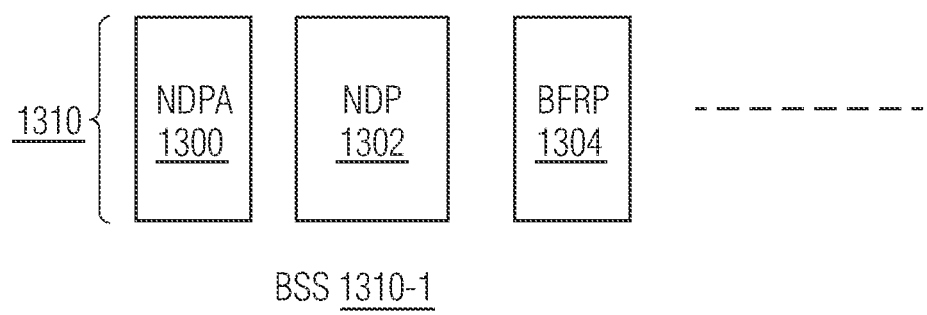
FIG. 13A depicts another example of a BSS that is used for subchannel sounding.

FIG. 13A depicts another example of a BSS that is used for subchannel sounding. With reference to FIG. 13A, a BSS operating channel (entire channel not shown) of a BSS 1310-1 is shown as including a subchannel 1310 being used to transmit an NDPA 1300, an NDP 1302, and a BFRP 1304 as part of independent subchannel sounding. In particular, FIG. 13A depicts the subchannel 1310 on which the NDPA 1300, the NDP 1302, and the BFRP 1304 may be transmitted via a first wireless device (not shown) to solicit full/partial subchannel bandwidth MU/SU feedback or full/partial subchannel bandwidth CQI feedback from a second wireless device (not shown).

Figure 13B:
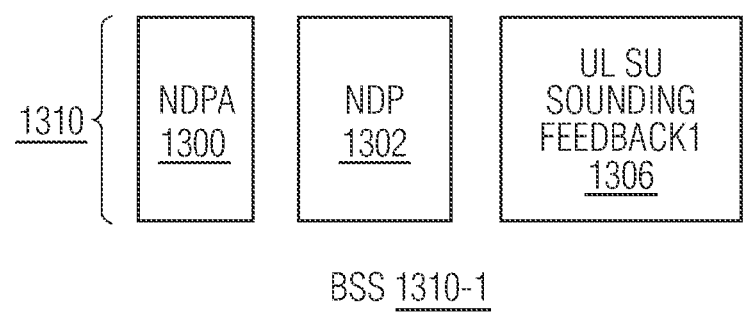
FIG. 13B depicts another example of a BSS that is used for subchannel sounding.

FIG. 13B depicts another example of a BSS that is used for subchannel sounding. With reference to FIG. 13B, the BSS operating channel (entire channel not shown) of the BSS 1310-1 is shown as including the subchannel 1310 being used to transmit the NDPA 1300, the NDP 1302, and an UL SU Sounding Feedback1 1306 as part of independent subchannel sounding. In particular, FIG. 13B depicts the subchannel 1310 on which the NDPA 1300, the NDP 1302, and the UL SU Sounding Feedback1 1306 may be transmitted via the first wireless device (not shown) to solicit full/partial subchannel bandwidth MU/SU feedback or full/partial subchannel bandwidth CQI feedback from the second wireless device (not shown).

In some embodiments, if an MU PPDU is transmitted on multiple subchannels, then each subchannel may include one or more Broadcast RUs. For example, a DL MU PPDU with multiple SUB-PPDUs may include multiple Broadcast RUs with the same Association Identifier (AID) identifier (e.g., RU descriptions in a SIG B). In some embodiments, each subchannel may include multiple Broadcast RUs, but the AID identifiers of the multiple Broadcast RUs may need to be different from each other. In some embodiments, recipients of the DL MU PPDU and transmitters of an UL TB PPDU may be different. In such an embodiment, the Broadcast RUs may carry Trigger frames to solicit the second wireless devices that may not be recipients of the DL MU PPDU to transmit High-Band (HB) PPDUs.

An example of a DL MU PPDU and an UL TB PPDU that includes Broadcast RUs transmitted in a BSS is described in further detail below with reference to FIG. 14.

Figure 14:
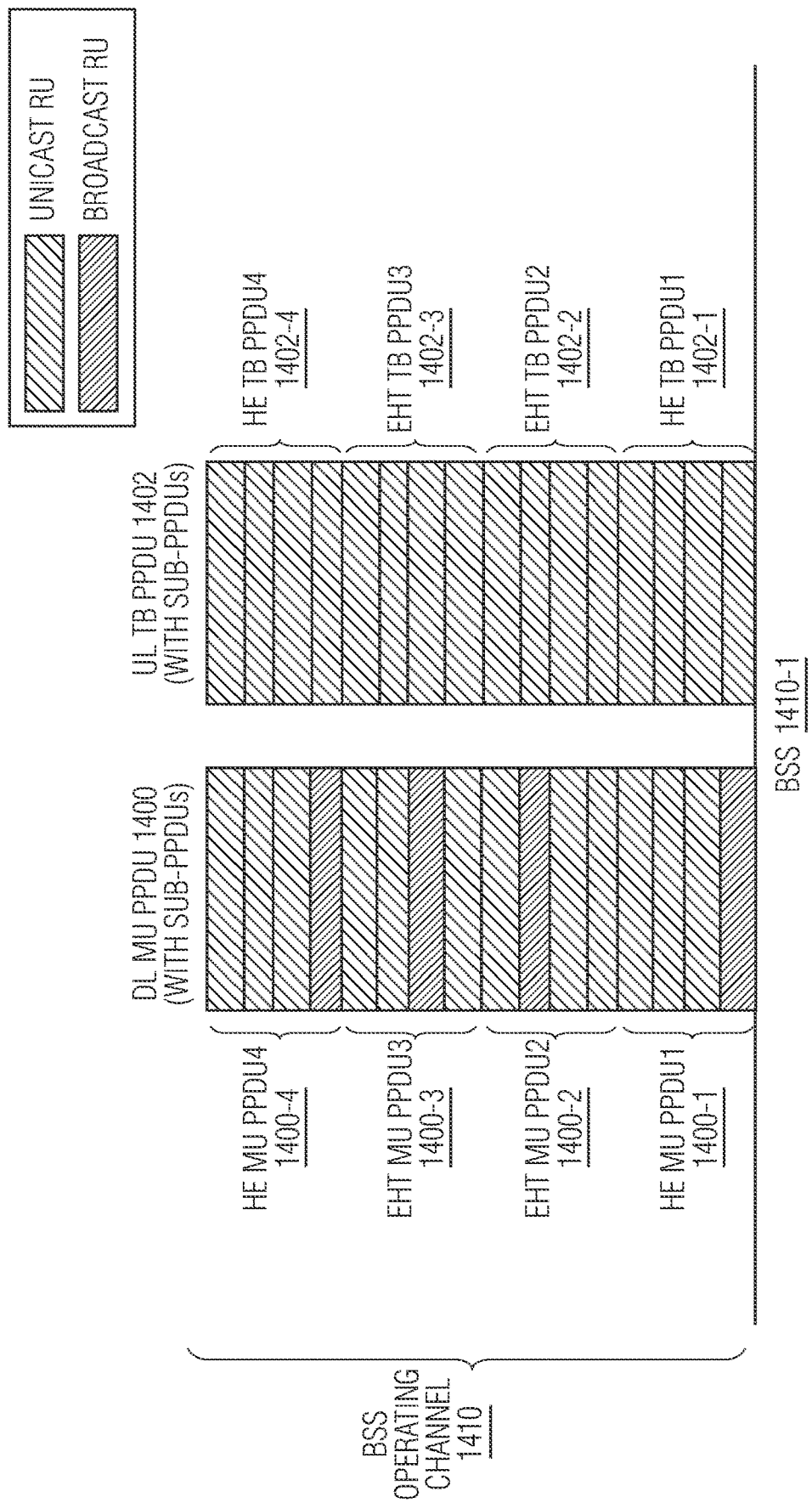
FIG. 14 depicts another example of a BSS that is used to transmit PPDUs.

FIG. 14 depicts another example of a BSS that is used to transmit PPDUs. With reference to FIG. 14, a BSS 1410-1 with a BSS operating channel 1410 is shown as being used to transmit a DL MU PPDU 1400 with SUB-PPDUs and an UL TB PPDU 1402 with SUB-PPDUs. In particular, FIG. 14 shows the DL MU PPDU 1400 as including four SUB-PPDUs, implemented as HE MU PPDU1 1400-1, EHT MU PPDU2 1400-2, EHT MU PPDU3 1400-3, and HE MU PPDU4 1400-4 and the UL TB PPDU 1402 as including four SUB-PPDUs, implemented as HE TB PPDU1 1402-1, EHT TB PPDU2 1402-2, EHT TB PPDU3 1402-3, and HE TB PPDU4 1402-4. In such an embodiment, each of the DL MU PPDU 1400 SUB-PPDUs and UL TB PPDU 1402 SUB-PPDUs may include four subchannels of the BSS operating channel 1410. In some embodiments, each DL MU PPDU 1400 SUB-PPDU (e.g., HE MU PPDU1 1400-1, EHT MU PPDU2 1400-2, EHT MU PPDU3 1400-3, and HE MU PPDU4 1400-4) may include one Broadcast RU (shown by boxes with hatching) and three unicast RUs. In such an embodiment, the Broadcast RUs may be identified by different AID values in each SUB-PPDU when more than one Broadcast RU exists. In some embodiments, each UL TB PPDU 1402 SUB-PPDU (e.g., HE TB PPDU1 1402-1, EHT TB PPDU2 1402-2, EHT TB PPDU3 1402-3, and HE TB PPDU4 1402-4) may include four unicast RUs.

In some embodiments, the BSS may be used by wireless devices for a multiple transmission of a group-addressed frame. In such an embodiment, a Broadcast frame may need to be transmitted in each subchannel where there may be second wireless devices (e.g., STAs) that may not periodically switch the subchannel that includes the primary 20 MHz channel. In one embodiment, the multiple transmission of one Broadcast frame in different subchannels may have a same Sequence Number value. In another embodiment, the multiple transmission of one Broadcast frame in different subchannels may each have 0 in a Retry subfield. In some embodiments, a Multicast frame may need to be transmitted in each subchannel where there may be second wireless devices (e.g., STAs) that belong to a Multicast group of a frame and which may not periodically switch to the subchannel that includes the primary 20 MHz channel. In one embodiment, a multiple transmission of one Multicast frame in different subchannels may have the same Sequence Number value. In another embodiment, a multiple transmission of one Multicast frame in different subchannels may each have 0 in the Retry subfield.

An example of a BSS that may be used by wireless devices for the multiple transmission of the group-addressed frame or the Multicast frame is described in further detail below with reference to FIG. 15.

Figures 15, 16:
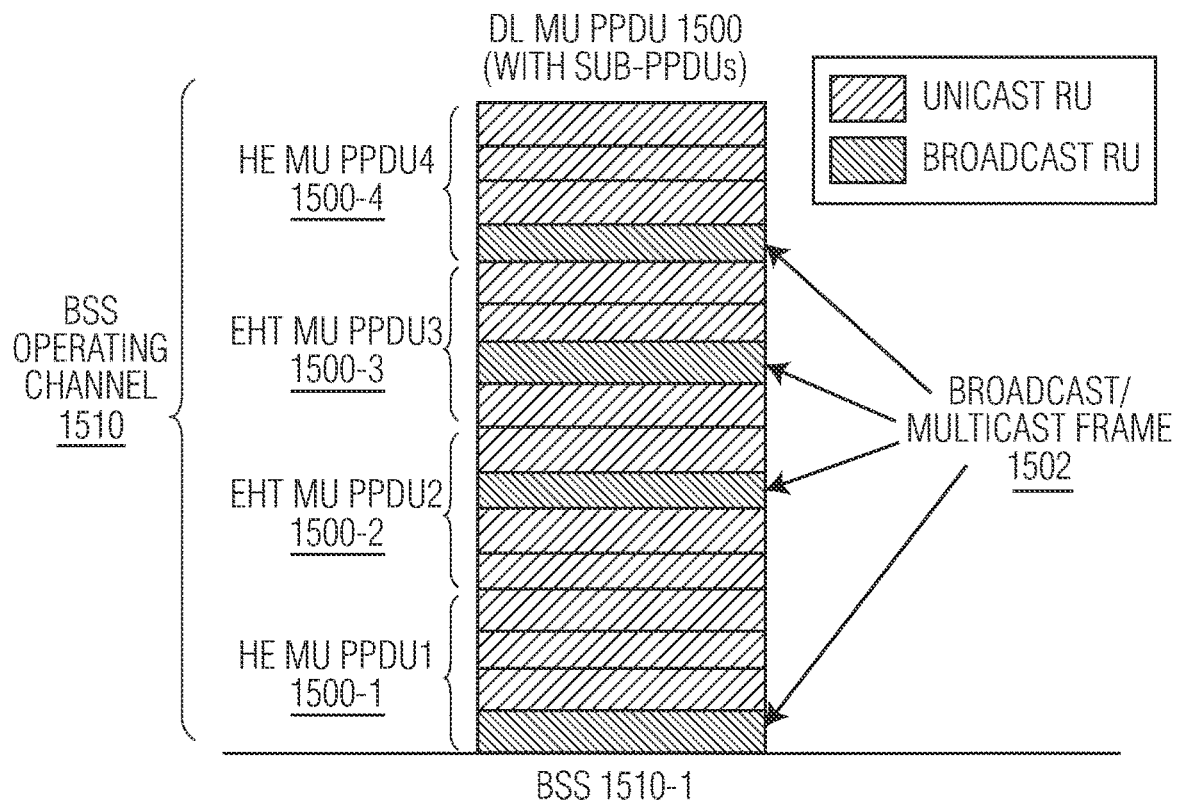
FIG. 15 depicts an example of a BSS that is used to transmit group-addressed frames or Multicast frames.
FIG. 16 illustrates a flow diagram of a technique for operating a BSS in accordance with an embodiment of the invention.

FIG. 15 depicts an example of a BSS that is used to transmit group-addressed frames or Multicast frames. With reference to FIG. 15, a BSS 1510-1 with a BSS operating channel 1510 is shown as being used to transmit a DL MU PPDU 1500 with SUB-PPDUs that may include a Broadcast frame or Multicast frame. In particular, FIG. 15 shows the DL MU PPDU 1500 as including four SUB-PPDUs, implemented as HE MU PPDU1 1500-1, EHT MU PPDU2 1500-2, EHT MU PPDU3 1500-3, and HE MU PPDU4 1500-4. In some embodiments, each DL MU PPDU 1500 SUB-PPDU (e.g., HE MU PPDU1 1500-1, EHT MU PPDU2 1500-2, EHT MU PPDU3 1500-3, and HE MU PPDU4 1500-4) may include one Broadcast RU (shown by boxes with hatching) and three unicast RUs. In such an embodiment, each Broadcast RU of the DL MU PPDU 1500 SUB-PPDUs may be included in a Broadcast/Multicast frame 1502. In such an embodiment, the Broadcast/Multicast frame 1502 may be a group-addressed frame or a Multicast frame for multiple transmission.

FIG. 16 illustrates a flow diagram of a technique for operating a BSS in accordance with an embodiment of the invention. At block 1602, a first wireless device announces to a second wireless device, a BSS operating channel, wherein the first wireless device has at least one of a first transmission power capability and a first bandwidth capability, the second wireless device has at least one of a second transmission power capability that is less than the first transmission power capability and a second bandwidth capability that is narrower than the first bandwidth capability, and wherein the BSS operating channel is at least one of a punctured operating channel and an unpunctured operating channel. At block 1604, the second wireless device associates with the first wireless device via the announcement of the BSS operating channel from the first wireless device. At block 1606, the first wireless device and the second wireless device exchange frames in the BSS operating channel.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a Basic Service Set (BSS), the method comprising:
announcing, by a first wireless device to a second wireless device, a BSS operating channel, wherein the first wireless device has at least one of a first transmission power capability and a first bandwidth capability, the second wireless device has at least one of a second transmission power capability that is less than the first transmission power capability and a second bandwidth capability that is narrower than the first bandwidth capability, and wherein the BSS operating channel is at least one of a punctured operating channel and an unpunctured operating channel;
associating, by the second wireless device, with the first wireless device via the announcement of the BSS operating channel from the first wireless device; and
exchanging frames between the first wireless device and the second wireless device in the BSS operating channel.

2. The method of claim 1, wherein the method further comprises:
announcing, by the first wireless device to the second wireless device, a group of subchannels, wherein each subchannel includes at least one 20 MHz channel, and wherein each subchannels is included in the BSS operating channel;
parking the second wireless device in at least one subchannel via a negotiation between the first wireless device and the second wireless device; and
exchanging frames between the first wireless device and the second wireless device in at least one subchannel that the second wireless device is parked in.

3. The method of claim 2, wherein the method further comprises:
announcing, by the first wireless device to the second wireless device, a dummy primary 20 MHz channel for each subchannel that does not include a primary 20 MHz channel, and wherein the dummy primary 20 MHz channel is an unpunctured 20 MHz channel.

4. The method of claim 3, wherein an operating bandwidth of the second wireless device that does not cover the primary 20 MHz channel covers the dummy primary 20 MHz channel when changing the operating bandwidth.

5. The method of claim 2, wherein the method further comprises:
announcing, by the first wireless device, operating parameters for the second wireless device parked in one subchannel.

6. The method of claim 5, wherein different operating parameters for the second wireless device parked in at least one 20 MHz channel include at least one of Enhanced Distribution Channel Access (EDCA) parameters and multi-user (MU) EDCA parameters.

7. The method of claim 1, wherein the first wireless device transmits soliciting frames and the second wireless device transmits responding frames that are each transmitted in the same TXOP; and
    wherein the responding frames are included in a Physical Layer Protocol Data Unit (PPDU) whose bandwidth is narrower than the PPDU that includes the soliciting frames.

8. The method of claim 7, wherein the first wireless device uses trigger information carried in at least one of a trigger frame and a triggered response scheduling (TRS) field to announce the bandwidth and the operating parameters for transmission of the responding frame; and
    wherein the responding frame is included in a Trigger-Based (TB) PPDU.

9. The method of claim 8, wherein transmission of the TB PPDU is the last transmission of a TXOP.

10. The method of claim 8, wherein the TB PPDU is transmitted in a TXOP protected by a Request-to-Send (RTS) frame and a Clear-to-Send (CTS) frame in a non-High Throughput (non-HT) duplicate PPDU.

11. The method of claim 1, wherein the first wireless device announces the bandwidth and the operating parameters of the second wireless device; and
    wherein the second wireless device determines the bandwidth and the operating parameters for transmission of the responding frame from the first wireless device's announcement.

12. The method of claim 1, wherein exchanging frames between the first wireless device and the second wireless device in the BSS operating channel further comprises:
    dividing, by the first wireless device, the BSS operating channel into subchannels;
    parking the second wireless device in a subchannel for at least one of a permanent period and at a specific period of time known by the first wireless device and the second wireless device; and
    transmitting multiple SUB-PPDUs in a PPDU on the subchannel, wherein the SUB-PPDUs are in non-overlapped subchannels and different SUB-PPDUs have at least one of a same PPDU format and a different PPDU format.

13. The method of claim 12, wherein the PPDU with multiple SUB-PPDUs with an MU PPDU format transmitted by the first wireless device allows multiple Broadcast resource units (RUs) in the PPDU, and wherein the Broadcast RUs are identified by different Association Identifier (AID) values in each SUB-PPDU with the MU PPDU format when more than one Broadcast RU exists.

14. The method of claim 12, wherein parking the second wireless device in the subchannel involves parking in a negotiated subchannel at a specific Target Wake Time (TWT) service period (SP) via a TWT Subchannel Selective Transmission (SST).

15. The method of claim 1, wherein the announcement of the BSS operating channel from the first wireless device announces at least one of a 20 MHz unpunctured channel and a 40 MHz unpunctured channel via at least one of a per-20 MHz bitmap and a per-40 MHz bitmap.

16. The method of claim 1, wherein the announcement of the BSS operating channel from the first wireless device identifies a channel segment via a center frequency of the channel segment for at least one of an 80 MHz BSS operating channel, a 160 MHz BSS operating channel, and a 320 MHz BSS operating channel.

17. A first wireless device, the first wireless device comprising:
    a processor configured to:
    establish a Basic Service Set (BSS) operating channel, wherein the BSS operating channel is at least one of a punctured operating channel and an unpunctured operating channel;
    announce at least one of the punctured operating channel and the unpunctured operating channel of the BSS operating channel to a second wireless device;
    associate with the second wireless device via the announcement of the BSS operating channel from the first device; and
    exchange frames with the second wireless device in the BSS operating channel.

18. A method for operating a Basic Service Set (BSS), the method comprising:
    in a punctured transmission, announcing, by a first wireless device to a second wireless device, a BSS operating channel, wherein the first wireless device has at least one of a first transmission power capability and a first bandwidth capability, the second wireless device has at least one of a second transmission power capability that is less than the first transmission power capability and a second bandwidth capability that is narrower than the first bandwidth capability, and wherein the BSS operating channel is at least one of a punctured operating channel and an unpunctured operating channel;
    associating, by the second wireless device, with the first wireless device via the announcement of the BSS operating channel from the first wireless device; and
    exchanging frames between the first wireless device and the second wireless device in the BSS operating channel.

* * * * *